United States Patent
Khan et al.

(10) Patent No.: US 8,072,943 B2
(45) Date of Patent: Dec. 6, 2011

(54) WIRELESS COMMUNICATION SYSTEM AND METHODOLOGY FOR COMMUNICATING VIA MULTIPLE INFORMATION STREAMS

(75) Inventors: Farooq Khan, Allen, TX (US); Cornelius Van Rensburg, Dallas, TX (US); Jin-Kyu Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 550 days.

(21) Appl. No.: 11/554,726

(22) Filed: Oct. 31, 2006

(65) Prior Publication Data
US 2007/0165104 A1    Jul. 19, 2007

Related U.S. Application Data

(60) Provisional application No. 60/748,725, filed on Dec. 9, 2005.

(51) Int. Cl.
*H04B 7/216* (2006.01)
(52) U.S. Cl. .......... 370/335; 455/522; 375/240.16; 375/240
(58) Field of Classification Search .......... 370/329, 370/335; 455/522; 375/240
See application file for complete search history.

(56) References Cited

U.S. PATENT DOCUMENTS

| | | | |
|---|---|---|---|
| 6,505,043 B1 | 1/2003 | Aihara | |
| 7,436,901 B2 * | 10/2008 | Tynderfeldt et al. | 375/299 |
| 7,519,029 B2 | 4/2009 | Takeda et al. | |
| 2001/0012322 A1 * | 8/2001 | Nagaoka et al. | 375/240 |
| 2004/0014482 A1 * | 1/2004 | Kwak et al. | 455/522 |
| 2004/0240415 A1 * | 12/2004 | Lane | 370/335 |
| 2005/0220192 A1 * | 10/2005 | Huang et al. | 375/240.16 |
| 2006/0153155 A1 * | 7/2006 | Jacobsen et al. | 370/338 |
| 2006/0280262 A1 * | 12/2006 | Malladi | 375/299 |

FOREIGN PATENT DOCUMENTS

KR   1020000077329 A   12/2000
KR   1020030057467 A   7/2003
* cited by examiner

*Primary Examiner* — Nick Corsaro
*Assistant Examiner* — Gerald Johnson

(57) ABSTRACT

A wireless communication system is disclosed wherein an information source communicates with a mobile station via multiple intermediary base stations located in respective cells of a broadcast zone. In one embodiment, each base station sends multiple information streams that may be received by a mobile station located in the broadcast zone. By receiving multiple information streams from multiple base stations, the mobile station may enhance reception. In one embodiment, a base station transmits an information stream that includes a base layer and another information stream including an enhanced layer. If a receiver in a mobile station receives an enhanced layer with more than a predetermined amount of quality, then the receiver uses information in the received enhanced layer to supplement information in the received base layer.

30 Claims, 13 Drawing Sheets

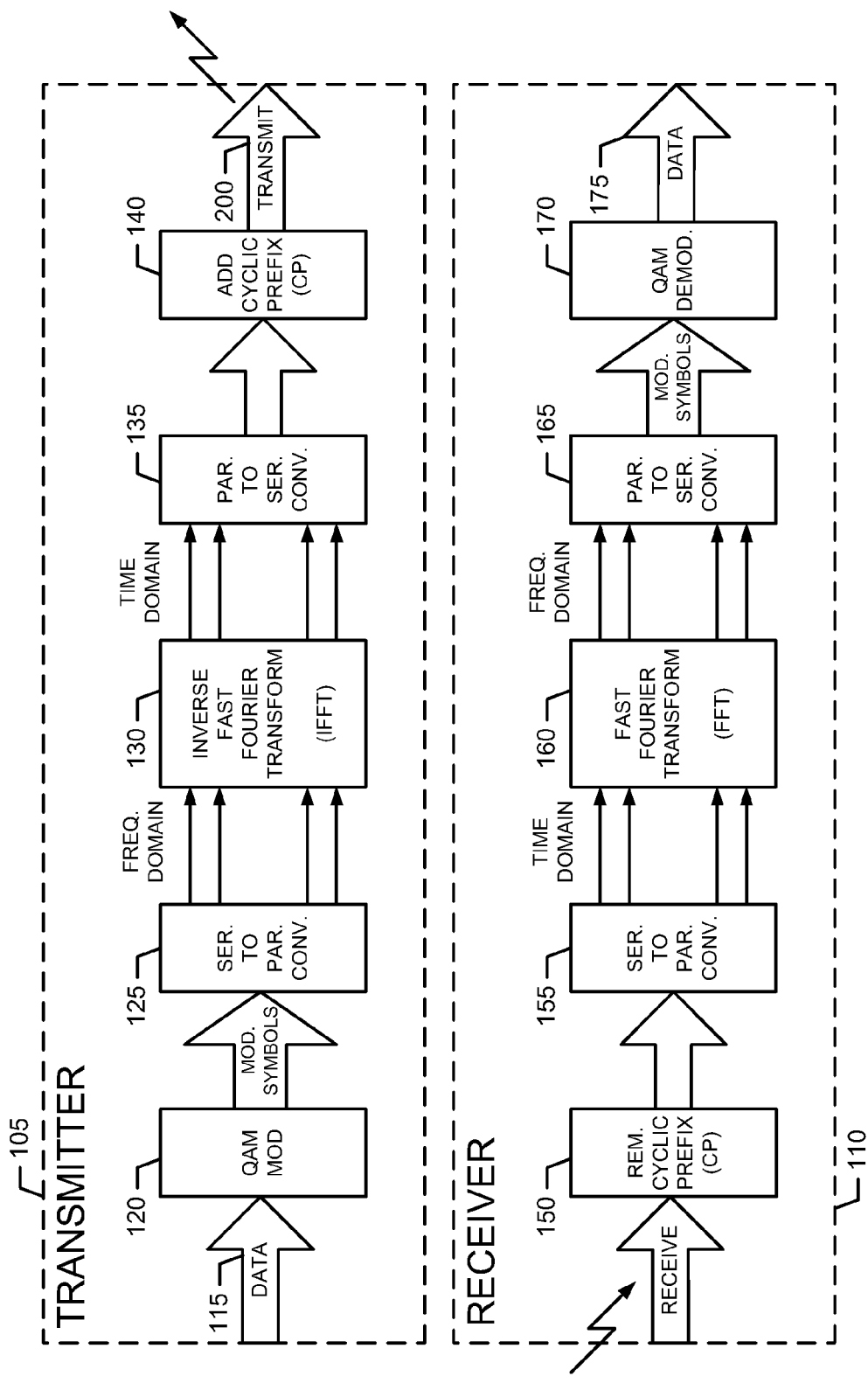

300

200

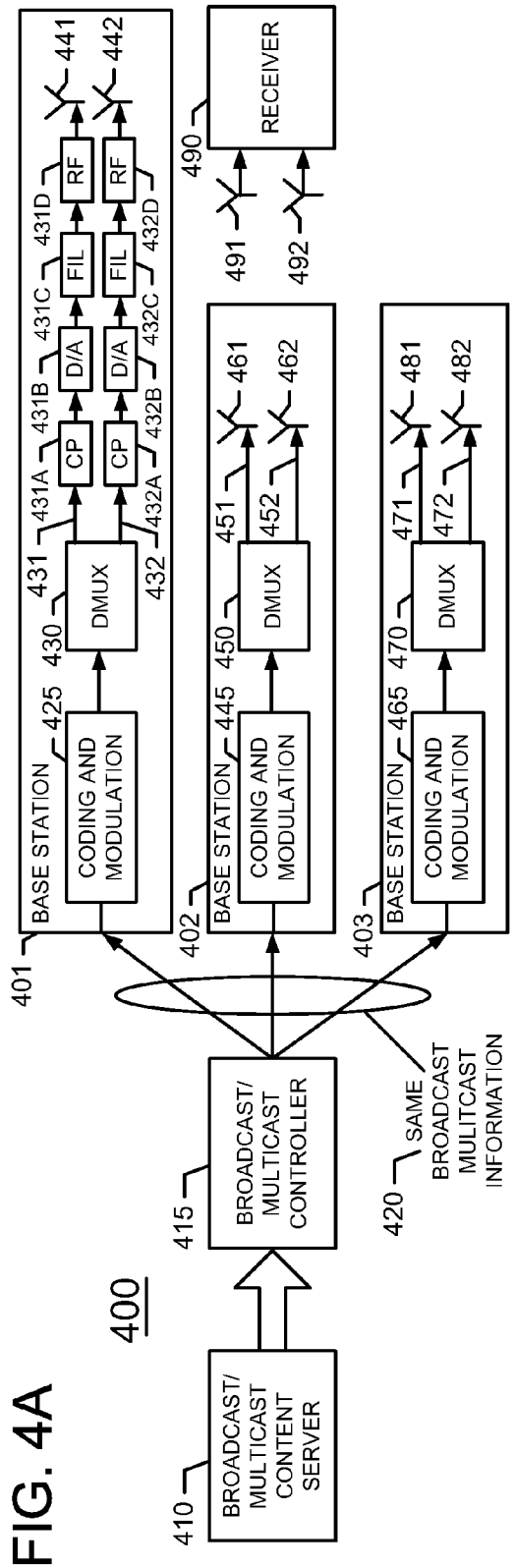
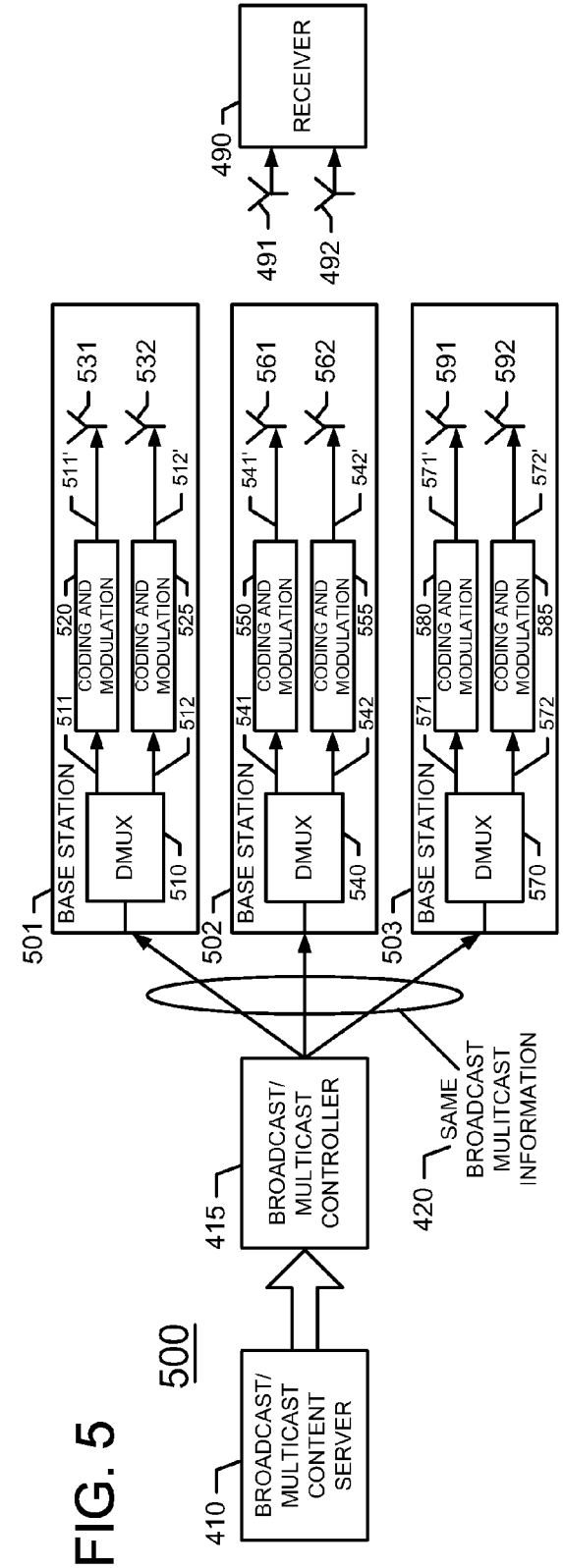
FIG. 4A
FIG. 5

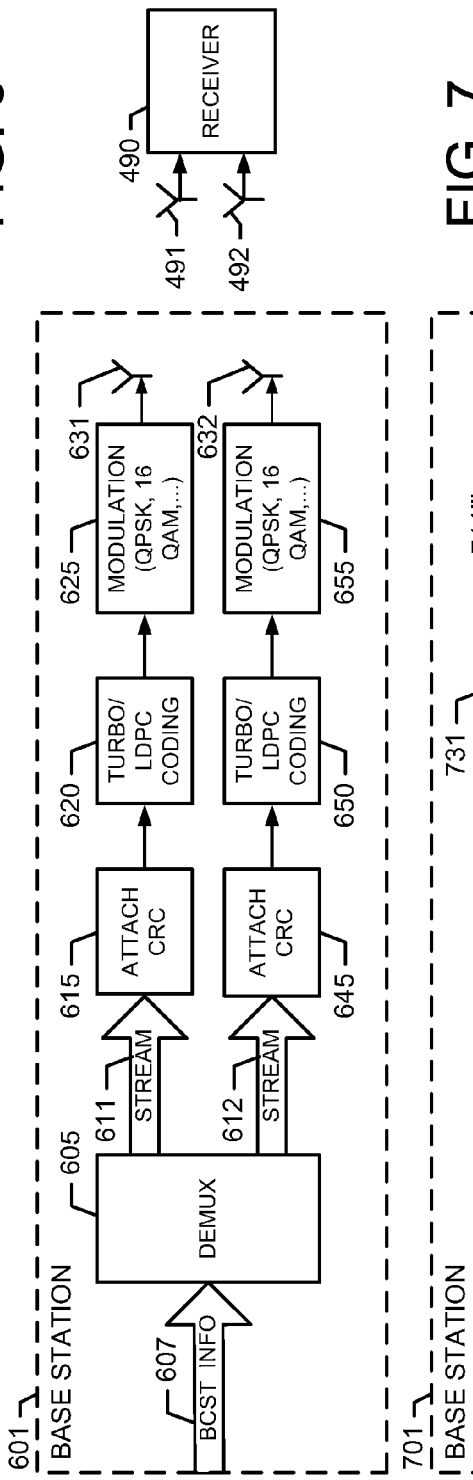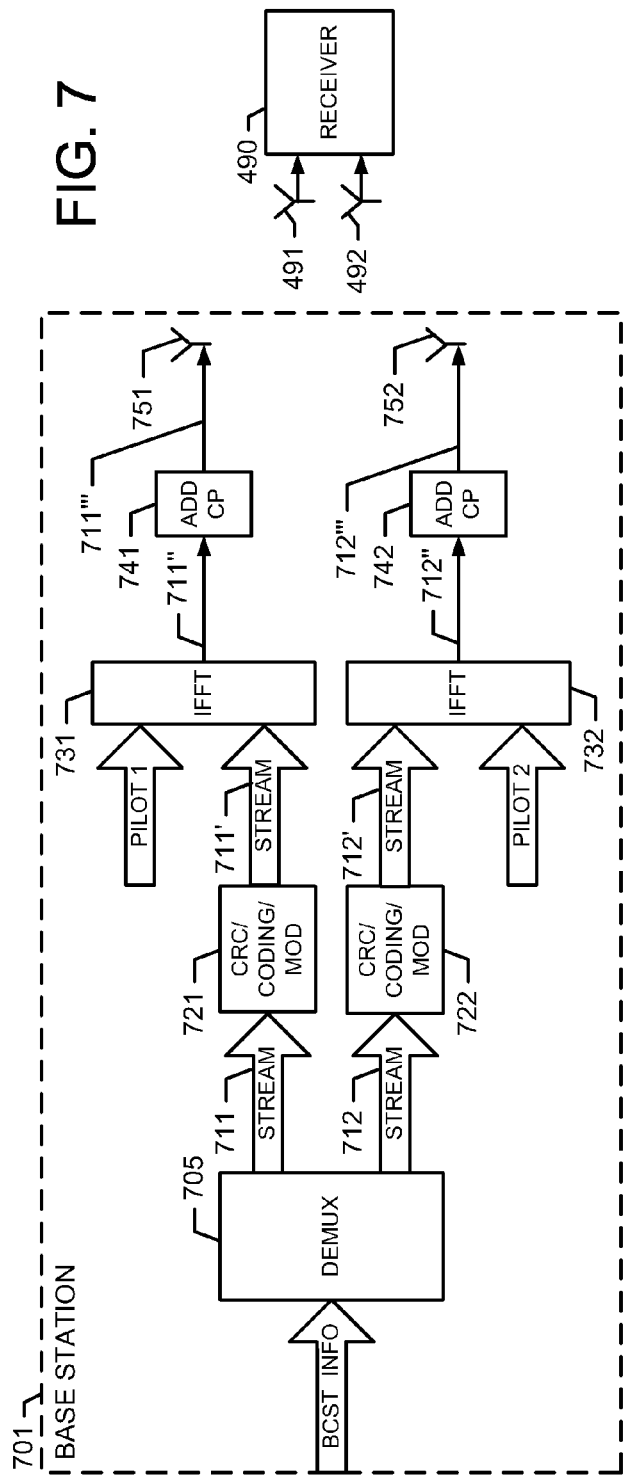

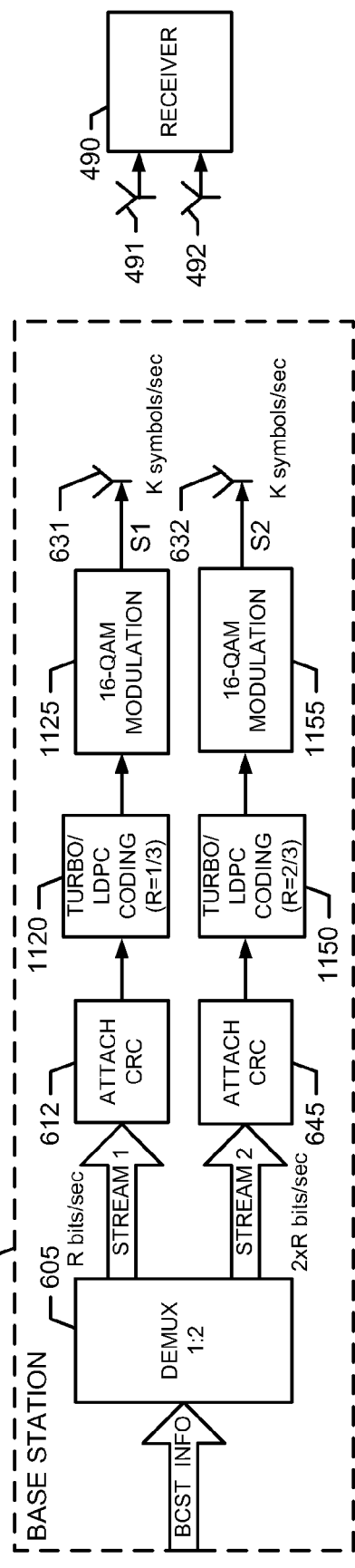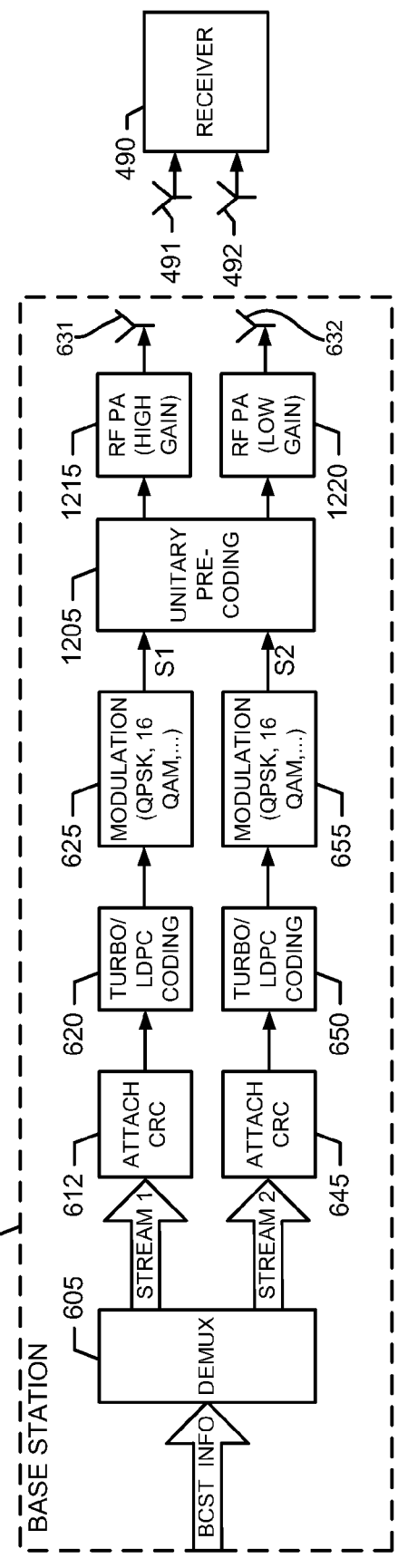

WIRELESS COMMUNICATION SYSTEM AND METHODOLOGY FOR COMMUNICATING VIA MULTIPLE INFORMATION STREAMS

RELATED PATENT APPLICATIONS

This patent application claims priority to the Provisional U.S. patent application by Rajkotia, et al., Ser. No. 60/748,725, filed Dec. 9, 2005, entitled "Bandwidth Allocation Mechanism In The Multihop Cellular Networks", which is assigned to the same assignee as the subject patent application and which is incorporated herein by reference in its entirety.

This patent application is related to the U.S. patent application by Khan, et al., Ser. No. 11/554,686, entitled "Wireless Communication Method And System for Communicating Via Multiple Information Streams", filed concurrently herewith, which is assigned to the same assignee as the subject patent application and which is incorporated herein by reference in its entirety.

TECHNICAL FIELD OF THE INVENTION

The disclosures herein relate generally to wireless communication systems, and more particularly, to wireless communications systems that employ signal processing techniques to increase system capacity and more effectively use available bandwidth.

BACKGROUND

A significant challenge that communications equipment designers face is how to pack more information into a given amount of radio frequency spectrum or bandwidth. Frequency division multiplexing (FDM) is a known technique for packing the transmission of data or information into several closely-spaced channels or subcarriers within a predetermined signal bandwidth. FDM systems may separate subcarrier frequency spectra by using frequency guard bands to avoid interference among the subcarriers. Unfortunately, this interference avoidance technique may increase system overhead and degrade bandwidth efficiency.

Orthogonal frequency division multiplexing (OFDM) provides a more robust technique for efficiently transmitting data using several subcarriers within a prescribed channel bandwidth. The OFDM method arranges the subcarriers for greater efficiency as compared with the FDM method that employs guard bands. More particularly, OFDM overlaps the spectra of the OFDM subcarriers to more efficiently pack the subcarriers into the available channel bandwidth. However, to avoid interference among the OFDM subcarriers, the OFDM technique typically requires that the subcarriers remain orthogonal to one another.

Many contemporary cellular communication systems employ OFDM technology as a way to embed information on a radio frequency signal. Cellular systems typically divide up a desired radio coverage area into a number of smaller geographic areas referred to as cells. Each cell includes a base station generally located at or near the center of the cell. The system assigns different radio frequencies to base stations in adjacent cells to avoid interference between adjacent cells. Mobile station users communicate with other mobile station users in the same or other cells via radio OFDM links through the base stations.

Cellular systems that employ OFDM may broadcast the same information simultaneously from all the cells of the system or from a subset of the cells. The cells or subset of cells form a broadcast zone. A mobile station receiver in the broadcast zone may potentially receive signal from all cells in the broadcast zone. A single frequency network (SFN) may be formed by synchronizing all the cells in the broadcast zone and employing OFDM as the communication mode. In such an SFN system, the signal to interference plus noise ratio (SINR) may be improved because a mobile station's receiver may collect the signal from all the cells in the broadcast zone without interference except for background noise and signals from other broadcast zones. This SFN OFDM technique may thus achieve improved recovery of broadcast information in comparison to other systems.

In conventional SFN OFDM systems, each base station in the broadcast zone may transmit a single stream of broadcast traffic. Unfortunately, the increase in broadcast traffic capacity with the signal-to-interference-plus-noise ratio (SINR) is logarithmic. Thus, for larger SINR, doubling of SINR results in a relatively low increase in broadcast traffic capacity. Although reception is improved, this method results in an inefficient use of valuable radio frequency spectrum.

What is needed is a wireless communication system that addresses the bandwidth efficiency problems discussed above.

SUMMARY

In one embodiment, a wireless communication system is disclosed that includes an information source. The information source provides a first information stream including a base layer and a second information stream including an enhanced layer. The base layer and the enhanced layer include information content. The system also includes a plurality of base stations coupled to the information source. Each base station transmits a first modulated signal including the base layer and a second modulated signal including the enhanced layer. The system further includes a mobile receiving station that receives some of the first modulated signals to provide first received signals including the base layer. The mobile station may also receive some of the second modulated signals to provide second received signals including the enhanced layer. The mobile receiving station tests the second received signals to determine if the mobile receiving station reliably received the second received signals. The mobile receiving station processes both the base layer and the enhanced layer of the first and second received signals, respectively, to reconstruct the information content if the mobile receiving station reliably received the second received signals.

In another embodiment, a method is disclosed for transmitting and receiving information. The method includes providing, by an information source, information content to a plurality of base stations situated in respective cells. The information content includes a first information stream including a base layer and a second information stream including an enhanced layer. The method also includes transmitting, by each of the base stations, a first modulated signal including the base layer and a second modulated signal including the enhanced layer. The method further includes receiving, by a mobile receiving station, some of the first modulated signals to provide first received signals including the base layer. The method still further includes receiving, by the mobile receiving station, some of the second modulated signals to provide second received signals including the enhanced layer. The method also includes testing, by the mobile receiving station, the second received signals to determine if the mobile receiving station reliably received the second received signals. The method further includes processing, by the mobile receiving station, both the base layer and the enhanced layer of the first and second received signals, respectively, to reconstruct the information content if the testing step determined that the mobile receiving station reliably received the second received signals.

BRIEF DESCRIPTION OF THE DRAWINGS

The appended drawings illustrate only exemplary embodiments of the invention and therefore do not limit its scope, because the inventive concepts lend themselves to other equally effective embodiments.

FIG. 1 shows a block diagram of a transmitter and receiver of a wireless communication device.

FIG. 4A is a block diagram of one embodiment of the disclosed wireless communication system including multiple base stations and a mobile station.

FIG. 5 is a block diagram of another embodiment of the disclosed wireless communication system including multiple base stations and a mobile station.

FIG. 6 shows a block diagram of an alternative base station usable in one embodiment of the disclosed wireless communication system.

FIG. 7 shows a block diagram of another alternative base station usable in one embodiment of the disclosed wireless communication system.

FIG. 11 shows a block diagram of an alternative base station usable in one embodiment of the disclosed wireless communication system.

FIG. 12 shows a block diagram of an alternative base station usable in one embodiment of the disclosed wireless communication system.

DETAILED DESCRIPTION

Figure 3:
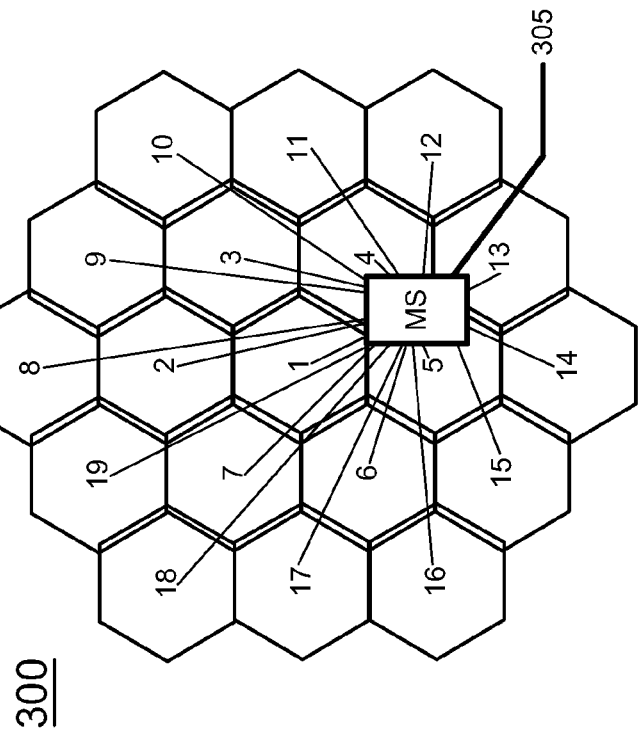
FIG. 3 shows multiple cells in a broadcast zone of a wireless communication system.

FIG. 1 shows a base station 100 that is usable in a conventional OFDM-based wireless communication system. Base station 100 includes both an OFDM transmitter 105 and an OFDM receiver 110. A mobile station may be similarly configured to communicate with base station 100. A data source 115 provides information or data to a quadrature amplitude modulator (QAM) circuit 120 that generates QAM modulated symbols at the QAM circuit output. A serial to parallel converter 125 converts the QAM modulated symbols to a parallel form, namely a series of sub-symbols. An inverse fast Fourier transform (IFFT) stage 130 receives the parallel converted signals and transforms these signals from the frequency domain to the time domain. IFFT stage 130 generates N time domain samples at its output, wherein N refers to the IFFT/FFT size used by the OFDM communication system. A parallel to serial converter 135 couples to the output of IFFT stage 130 to convert the time domain signals it receives therefrom to a serial format.

Figure 2:
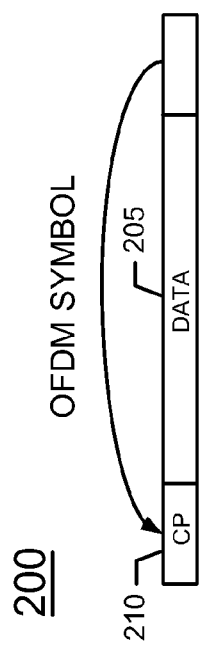
FIG. 2 is a graphic representation of on OFDM signal.

An add cyclic prefix (CP) stage 140 couples to the output of parallel to serial converter 135 to add a cyclic prefix to the signal sequence it receives from the parallel to serial converter 135. The resulting sequence of signals at the add CP prefix stage output is referred to as an OFDM symbol 200, such as shown in FIG. 2. OFDM symbol 200 includes data 205 and a cyclic prefix 210.

Returning to FIG. 1, receiver 110 includes a cyclic prefix (CP) removal stage 150 that removes the cyclic prefix from the OFDM signal that it receives. A serial to parallel converter stage 155 converts the signal from CP removal stage 150 to a parallel format. A fast Fourier transform (FFT) stage 160 receives the parallel converted signal in the time domain and transforms that signal to the frequency domain at the output of FFT stage 160. A parallel to serial converter 165 converts the output signal of FFT stage 160 from a parallel format to a serial format. The resulting QAM modulated symbols feed from converter 165 to a QAM demodulator 170. QAM demodulator 170 demodulates the QAM symbols into data 175.

FIG. 3 shows cells 1-19 that together form a broadcast zone 300 of a conventional wireless communications system. Each cell includes a base station, tower and antenna (not shown) typically located at the center of the cell. Cells 1-19 are a subset of all of the cells of the communication system. In one possible system configuration, all cells 1-19 of the subset of cells in the broadcast zone simultaneously transmit the same information content. Thus a receiver, such as mobile station 305, listening to the broadcast content may potentially receive signals from all of the cells in the broadcast zone. If the system employs OFDM for transmission, and if all of the cells in the broadcast zone are synchronized, a single frequency network (SFN) may be formed. In such an SFN system, a receiver in mobile station 305 may collect signal from all of the cells of the broadcast zone without interference except for background noise and any interference from the cells not belonging to the broadcast zone. This topology facilitates better recovery of the broadcast information due to improvement in the signal-to-interference-plus-noise ratio (SINR).

In the conventional communications system discussed above with reference to FIG. 3, each base station in the respective cells 1-19 of the broadcast zone transmits a single stream of broadcast traffic. This results in a logarithmic increase in broadcast traffic capacity because for the very high SINR of this SFN system, the increase in capacity with SINR is logarithmic as given by Shannon's capacity formula, Equation 1:

$$\text{Capacity} = \log_2(1 + \text{SINR}) \text{ b/s/Hz} \qquad \text{Equation 1}$$

However, for SINR much greater than 1, the capacity is given by Equation 2:

$$\text{Capacity} = \log_2(\text{SINR}) \text{ b/s/Hz (for SINR} \gg 1) \qquad \text{Equation 2}$$

Thus, for larger SINR, doubling of SINR results in only a 1 b/s/Hz increase in capacity for this SFN system. For this reason, a conventional SFN system that employs a single broadcast stream results in inefficient use of scarce radio frequency spectrum.

FIG. 4A shows one embodiment of the disclosed wireless communication system 400 wherein multiple base stations or cells each transmit multiple broadcast streams over multiple antennas. More particularly, system 400 includes master stations 401, 402 and 403, each master station being situated in a respective cell (not shown). Other systems are contemplated wherein the system employs two master stations, or more than three master stations, depending on the particular application. In this embodiment, system 400 exhibits a multiple-input multiple-output (MIMO) configuration in that multiple streams are transmitted by multiple antennas.

System 400 includes a broadcast/multicast content server 410 that provides information or content to be broadcast or multicast by the system. Server 410 couples to a broadcast/multicast controller 415 to provide controller 415 with the information. The coupling between server 410 and controller 415 may be either wired or wireless depending on the particular application. Controller 415 couples to base stations 401, 402 and 403 to provide the information, now designated as information 420, to these base stations in their respective cells. The coupling between controller 415 and base stations 401, 402 and 403 may be either wired or wireless depending on the particular application. For purposes of this document, the term "wired" includes electrical conductors, optical conductors and other physical conductors. In one embodiment, broadcast/multicast content server 410 and broadcast/multicast controller 415 are coupled to, and controlled by, a central control facility (not shown) located either inside or outside of the broadcast zone formed by cells 401-403. The coupling between the central control facility and server 410/controller 415 may itself be either wired on wireless.

Base stations 401, 402 and 403 each receive the same information 420 and perform the same signal processing operations on that information. By way of example, base station 401 includes a coding and modulation stage 425 that channel codes and modulates the information. In one embodiment, the coding performed by coding and modulation stage 425 adds redundancy to the information transmitted by the base station to improve the reliability of transmission. The modulation function performed by coding and modulation stage 425 determines how the coded information bits modulate the RF carrier transmitted by the base station. More particularly, in one embodiment, coding and modulation stage 425 employs OFDM to modulate the information on a radio frequency signal. A demultiplexer (DMUX) 430 couples to coding and a modulation stage 425. DMUX 430 demultiplexes the signal it receives into multiple parallel streams. The number of parallel streams that base station 401 transmits depends on the number of available antennas in the base station. In this particular example, DMUX 430 demultiplexes the signal into two parallel streams, namely stream 431 and stream 432. After further processing by stages 431A-431D, streams 431 and 432 are provided to two antennas respectively, namely antenna 441 and antenna 442. In another embodiment, if base station 401 employs three antennas, then demultiplexer 430 would provide three streams to those three antennas, respectively. In a similar manner, DMUX 430 may demultiplex the signal into more than three streams provided that base station 401 includes a respective antenna for each stream.

More detail is now provided with respect to the processing that stages 431A-431D perform on stream 431. One output of demultiplexer DMUX 431 couples to CP stage 431A such that CP stage 431 adds a cyclic prefix to stream 431. Digital to analog (D/A) conversion and filtering are provided to stream 431 by D/A converter 431B and filter 431C, respectively. A radio frequency (RF) amplifier stage 431D couples to filter 431C to provide RF amplification to the filtered RF signal that filter 431C provides to RF amplifier 431D. The resultant amplified RF signal feeds antenna 441 for transmission thereby. In a similar manner, stages 432A-432D process stream 432 before providing the resultant amplified RF signal to antenna 442.

Base stations 402 and 403 exhibit substantially the same circuit topology as base station 401, as seen in FIG. 4A. More particularly, coding and modulation stage 445, DMUX 450, stream 451, stream 452, antenna 461 and antenna 462 of base station 402 correspond respectively to coding and modulation stage 425, DMUX 430, stream 431, stream 432, antenna 441 and antenna 442. For simplicity in the FIG. 4A drawing, the CP stages, D/A stages, filter stages and RF amplifiers are not shown in base station 402 or base station 403, although these components may be employed in actual practice as shown in base station 401. In a similar manner, the components of base station 403 correspond to respective components of base station 401 and base station 402.

As described above, all base stations 401, 402 and 403 receive the same information to transmit from broadcast/multicast controller 415. Each base station splits the coded and modulated information into two parallel first and second information streams. Antennas 441, 461 and 481 transmit substantially identical first information streams 431, 451 and 471, respectively. Antennas 442, 462 and 482 transmit substantially identical second information streams 432, 452 and 472, respectively. In this manner, information streams 431, 451 and 471 form corresponding streams. Information streams 432, 452 and 472 also form corresponding streams.

Because substantially the same information stream is transmitted by corresponding antennas 441, 461 and 481 of all the base stations, the transmissions from the multiple base stations appear as multipath transmissions to a mobile station 490 receiving the broadcast/multicast content. The mobile station or receiver 490 includes two receive antennas, namely antenna 491 and antenna 492. If all base stations transmitting the broadcast content include at least two transmit antennas, then two spatially-multiplexed streams can be transmitted to mobile receivers having at least two antennas, such as mobile station 490. If the base stations include more antennas and respective streams than the two shown, receiver 490 may includes a larger number of antennas than two to accommodate all transmitted information streams, namely one antenna per information stream. It is noted that antennas 442, 462 and 482 also transmit substantially the same information. Within each antenna pair per base station, for example antenna pair 441, 442, each antenna exhibits spatial diversity with respect to the other. Likewise antennas 491, 492 exhibit spatial diversity in the receiver of mobile station 490.

Figure 4B:
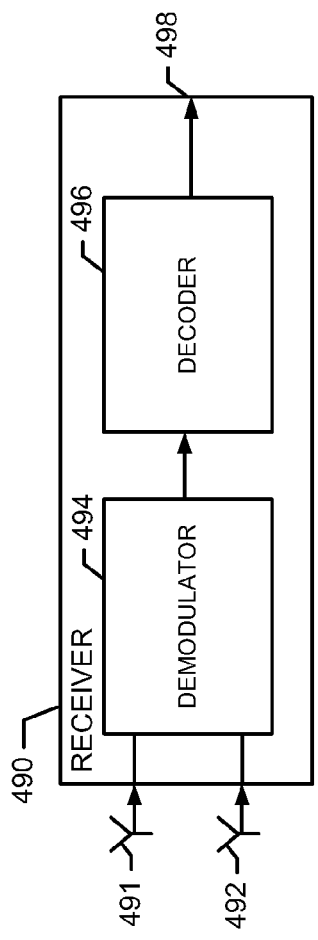
FIG. 4B is a block diagram of a representative mobile receiving station of the system of FIG. 4A.

FIG. 4B shows a block diagram of a representative receiver that may be used as a receiver for mobile station 490. Mobile station receiver 490 includes a demodulation stage 494 that couples to antennas 491 and 492. Demodulation stage 494 demodulates whatever modulation type is employed in base stations 401, 402 and 403. In the example of FIG. 4A wherein coding and modulation stage 425 employs QAM modulation, then demodulation stage 494 demodulates QAM signals. In further embodiments described below wherein the base stations employs QPSK modulation, then demodulation stage 494 demodulates QPSK signals. In yet other embodiments described below, wherein the base stations transmit signal streams of different modulation types, for example one stream of QAM signals and another stream of QPSK signals, then demodulation stage 494 demodulates signals streams of each modulation type. In other words, demodulation stage 494 demodulates a received QAM modulated information stream and a received QPSK information stream. Mobile station receiver 490 also includes a decoder 496 coupled to the demodulation stage 494. Decoder 496 decodes whatever coding type was employed by coding and modulation stage 425 in the base stations to code the information streams to be transmitted. Representative coding types that may be employed by the base stations to code information streams include turbo coding, low density parity check (LDPC) coding and unitary pre-coding, as discussed in more detail below. Depending on the type of coding employed by the base stations, the decoder 496 of the mobile receiving station 490 is selected to decode that type of coding. The decoded information content is provided to receiver output 498.

FIG. 5 shows another embodiment of the disclosed wireless communication system as system 500. System 500 includes elements in common with system 400, discussed above. In comparing system 500 of FIG. 5 with system 400 of FIG. 4A, like numbers indicate like elements. In system 500, each of the information streams transmitted by the multiple antennas shown is separately encoded and modulated. In more detail, system 500 includes base stations 501, 502 and 503. By way of example, base station 501 includes a demultiplexer, DMUX 510, which separates information provided thereto into two information streams 511 and 512. DMUX 510 includes two outputs that couple to coding and modulation stages 520 and 525, respectively, as shown. In this manner, each information stream is provided with a respective dedicated coding and modulation stage. Coding and modulation stage 520 channel codes and modulates information stream 511, thus generating a coded modulated information stream 511' at its output. Similarly, coding and modulation stage 525 channel codes and modulates information stream 512, thus generating a coded modulated information stream 512' at its output. Base station 501 includes antennas 531 and 532 that transmit coded modulated information streams 511' and 512', respectively. In a manner similar to that of base station 401 of FIG. 4A, each of the information streams of base station 501 is processed by respective CP stages, D/A stages, filter stages and RF amplifiers (not shown) before being applied to respective antennas 531 and 532.

Base stations 502 and 503 exhibit substantially the same topology as base station 501, as shown in FIG. 5. More particularly, base station 502 includes a DMUX 540, a coding and a modulation stage 550, a coding and a modulation stage 555, and antennas 561, 562, that correspond respectively to the base station 501 components DMUX 510, coding and modulation stage 520, coding and modulation stage 525, and antennas 531, 532. In a similar manner, the components of base station 503 correspond to respective components of base station 501 and base station 502, as shown. The topology of system 500 provides for separate coding and modulation of multiple information streams in each base station, namely two information streams in this particular example. In one embodiment, the information content is targeted at multiple mobile stations in a multi-cast/broadcast transmission. For this reason, it is typically not possible to adapt the modulation and coding for the information transmitted over multiple antennas. A fixed modulation and coding scheme may be used for transmission from multiple antennas, as shown. However, each of the transmitted information streams may be separately cyclic redundancy check (CRC) protected and encoded/modulated, as shown in FIG. 6 discussed below.

FIG. 6 shows a representative base station 601 that applies CRC protection to each of multiple information streams and which separately encodes and modulates each of these multiple information streams. Base station 601 may be employed as an alternative to base stations 501, 502 and 503 of FIG. 5. In more detail, a demultiplexer (DMUX) 605 in representative base station 601 receives a broadcast information stream 607. DMUX 605 divides or splits that information stream into multiple information streams, namely information streams 611 and 612 in this particular example. A CRC attachment stage 615 applies a CRC code to stream 611. A turbo coding/low density parity check (LDPC) coding stage 620 couples to CRC attachment stage 615. Stage 620 either turbo codes or LDPC codes the information stream provided thereto. A turbo code is a class of concatenated error-control coding methods that offer high performance while requiring just moderate complexity. An iterative principle may be employed for decoding turbo codes. In a manner similar to turbo codes, LDPC codes also employ an iterative decoding methodology. LDPC codes are constructed using sparse random parity check matrices. A modulation stage 625 couples to turbo/LDPC coding stage 620 to modulate a radio frequency signal with the coded information stream that it receives from turbo/LDPC coding stage 620. Modulation stage 625 may employ quadrature phase shift keying (QPSK) or quadrature amplitude modulation (QAM) to perform such modulation. Modulation stage 625 generates a modulated signal that is provided to antenna 631 for transmission.

CRC attachment stage 615, turbo/LDPC coding stage 620, modulation stage 625 and antenna 631 together form a signal path for processing information stream 611. In a similar manner, CRC attachment stage 645, turbo/LDPC coding stage 650, modulation stage 655 and antenna 632 form a signal path for processing information stream 612. Thus, antennas 631 and 632 both transmit respective information streams of common content modulated on OFDM signals. A wireless communication system using the base station technology of FIG. 6 may exhibit a system topology like that of system 400 of FIG. 4A, except that base stations 601 are substituted for each of base stations 401, 402 and 403. In actual practice, base station 600 may employ additional signal processing stages as shown in FIG. 4A, such as a CP stage 431A, D/A stage 431B, filter stage 431C and RF stage 431D, between modulation stage 625 and antenna 631. Similar additional processing stages may be employed between modulation stage 655 and antenna 632.

FIG. 7 shows a base station 701 that may be employed as an alternative to base stations 501, 502 and 503 of FIG. 5. In this embodiment, DMUX 705 demultiplexes information into an information stream 711 and an information stream 712. CRC/coding/modulation stage 721 attaches a CRC code, encodes, and modulates information stream 711 to generate coded stream 711'. The coding in stage 721 is performed using a channel coder such as turbo code or LDPC code. The modulation in stage 721 may be performed by using QAM, QPSK or any other suitable modulation scheme. An inverse fast Fourier transform (IFFT) circuit 731, such as a digital signal processor (DSP), performs an inverse fast Fourier transform on information stream 711' and a PILOT1 signal to convert the coded information stream 711' and PILOT1 from the frequency domain to the time domain, thus generating a converted coded information stream 711" at its output. An add cyclic prefix (CP) circuit 741 couples to the output of IFFT circuit 731 to attach a cyclic prefix to converted coded information stream 711", thus generating an information stream 711''' that is transmitted by antenna 751. In actual practice, a D/A converter, filter and RF amplifier (not shown) may be situated between add CP circuit 741 and antenna 751 to further process information stream 711' in a manner similar to stages 431B-431D of FIG. 4A.

CRC/coding/modulation stage 721, IFFT circuit 731, add CP circuit 741 and antenna 751 together form a signal path for processing the information stream 711 provided by DMUX 705. In a similar manner, CRC/coding/modulation stage 722, IFFT circuit 732, add CP circuit 742 and antenna 752 together form a signal path for processing information stream 712 provided by DMUX 705. In actual practice, a D/A converter, filter and RF amplifier (not shown) may be situated between add CP circuit 742 and antenna 752 to further process information stream 712''' in a manner similar to stages 431B-431D of FIG. 4A. In the latter signal path for information stream 712, the pilot signal, PILOT 2, is orthogonal to pilot signal PILOT 1. Thus, in this embodiment, orthogonal pilot signals are transmitted for each of antennas 751 and 752 of a given base station. The pilot or reference signals PILOT 1 and PILOT 2 are sequences known at the receiver 490. Receiver 490 compares the received pilot signals with a stored known pilot sequence to determine channel estimates. The channel estimates for PILOT 1 and PILOT 2 are used by receiver 490 to demodulate and decode information stream 711 and information stream 712 respectively. As stated above, a broadcast zone may have multiple base stations, each with multiple antennas as shown in FIG. 7. The pilot signals for multiple antennas in multiple base stations in a broadcast zone may use the same time-frequency resource shown in FIGS. 8A and 8B.

Figure 8B:
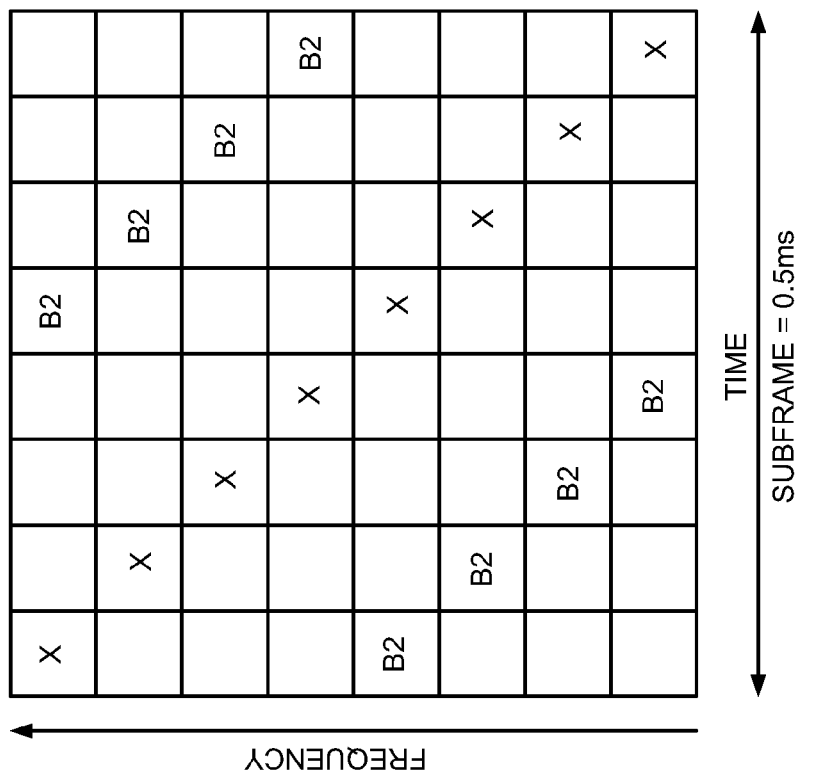
FIGS. 8A and 8B depict a broadcast/multicast pilot symbol mapping to an orthogonal time frequency resource for transmission from two base station antennas in the disclosed wireless communication system.
Figure 8A:
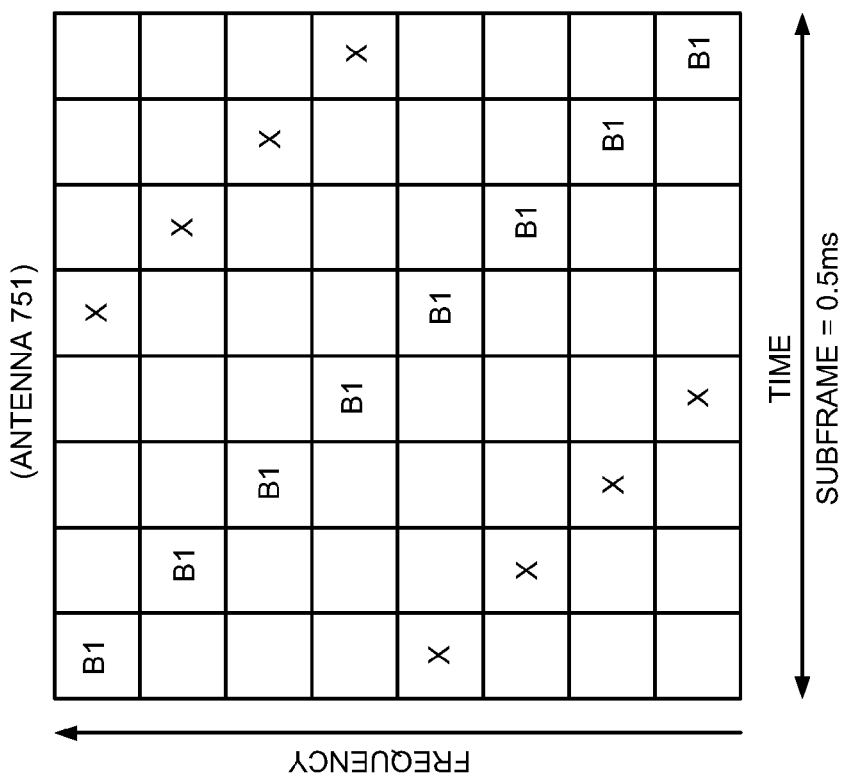

FIGS. 8A and 8B depict a broadcast/multicast pilot symbol mapping to an orthogonal time-frequency resource for transmission from two base station antennas, namely antenna 751 in FIG. 8A and antenna 752 in FIG. 8B. For simplicity, antenna 751 is designated as antenna 1 and antenna 752 is designated as antenna 2. The horizontal axis shows time that is divided into subframes of 0.5 ms each. The vertical axis shows frequency. In the symbol mapping of FIG. 8A, B1 designates the pilot signal, PILOT 1, and in FIG. 8B, B2 designates the pilot signal PILOT 2. In the time-frequency resource mapping wherein multiple base stations in a broadcast zone transmit PILOT 1 (B1), no signal is transmitted on antennas 2 of the base stations. Conversely, antennas 1 of the multiple base stations in the broadcast zone transmit no signal on time-frequency locations wherein PILOT 2 (B2) is transmitted, as seen by comparing FIG. 8A and FIG. 8B. In one embodiment, a time-frequency resource consists of a set of OFDM subcarrier frequencies over a given time interval such as a subframe of 0.5 ms. Two different scrambling codes may be employed for antennas 1 and 2. The scrambling codes are applied before the IFFT stages in FIG. 7 to stream 711' and 712' and also to PILOT 1 and PILOT 2. A scrambling code generally is a pseudo-random number (PN) sequence that is pre-known at the receiver and stored in a memory (not shown) therein.

Figure 9:
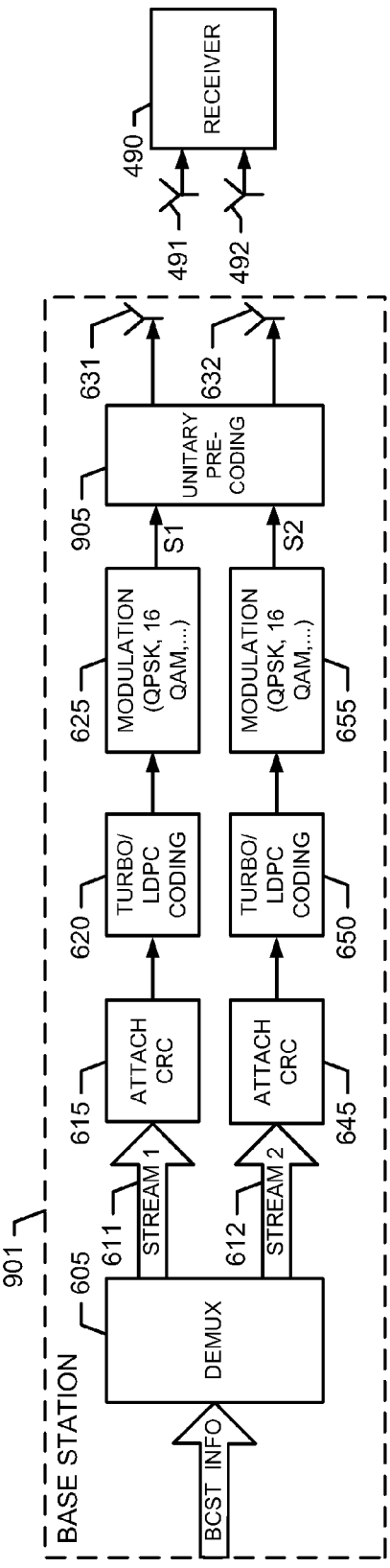
FIG. 9 shows a block diagram of yet another alternative base station usable in one embodiment of the disclosed wireless communication system.

FIG. 9 shows an embodiment of a base station 901 that transmits broadcast/multicast streams over multiple transmit antennas wherein the streams are unitary pre-coded before stream mapping to the antennas. In actual practice, multiple base stations 901 in respective cells are employed to cover a particular broadcast zone. In this embodiment, each of the information streams is potentially transmitted from all of the antennas used in the broadcast/multicast information transmission. This unitary pre-coding technique can be used in both cases wherein the information streams are separately encoded and modulated, and also wherein the information streams are jointly encoded and modulated.

Base station 901 includes many elements in common with base station 601 of FIG. 6, namely the multiplexer 605, attach CRC stages 615, 645, turbo coding/LDPC coding stages 620, 650, modulation stages 625 and 655, and antennas 631 and 632. STREAM 1 refers to information transmitted by the upper signal path formed by attach CRC stage 615, turbo/LDPC coding stage 620, modulation stage 625, unitary pre-coding stage 905 and antenna 631. STREAM 2 refers to the information stream transmitted by the lower signal path formed by attach CRC stage 645, turbo/LDPC coding stage 650, modulation stage 655, unitary pre-coding stage 905 and antenna 632.

Unitary pre-coding stage 905 performs unitary pre-coding on the two information streams provided thereto before these information streams are transmitted by antennas 631 and 632. Two examples of unitary pre-coding matrices, P1 and P2, for the two antennas per base station are:

$$P1 = \frac{1}{\sqrt{2}}\begin{bmatrix} 1 & 1 \\ 1 & -1 \end{bmatrix}, P2 = \frac{1}{\sqrt{2}}\begin{bmatrix} 1 & 1 \\ j & -j \end{bmatrix}$$

Unitary pre-coding stage 905 receives modulated symbols S1 and S2 from modulation stages 625 and 655, respectively, as shown in FIG. 9. Unitary pre-coding stage 905 pre-codes the modulated symbols S1 and S2 with pre-coding matrices P1 and P2. Assuming modulation symbols S1 and S2 are transmitted at any given time from stream 1 and stream 2, respectively, then modulation symbols after pre-coding with matrix P1 and P2 may be written as:

$$T1 = P1\begin{bmatrix} S1 \\ S2 \end{bmatrix} = \frac{1}{\sqrt{2}}\begin{bmatrix} 1 & 1 \\ 1 & -1 \end{bmatrix} \times \begin{bmatrix} S1 \\ S2 \end{bmatrix} = \frac{1}{\sqrt{2}}\begin{bmatrix} S1+S2 \\ S1-S2 \end{bmatrix}$$

$$T2 = P2\begin{bmatrix} S1 \\ S2 \end{bmatrix} = \frac{1}{\sqrt{2}}\begin{bmatrix} 1 & 1 \\ j & -j \end{bmatrix} \times \begin{bmatrix} S1 \\ S2 \end{bmatrix} = \frac{1}{\sqrt{2}}\begin{bmatrix} S1+jS2 \\ S1-jS2 \end{bmatrix}$$

Antennas 631 and 632 of base station 901 will respectively transmit the following pre-coded signals, T11 and T12, when unitary pre-coding stage 905 uses P1 as the pre-coding matrix:

$$T11 = \frac{(S1+S2)}{\sqrt{2}}$$

$$T12 = \frac{(S1-S2)}{\sqrt{2}}$$

However, antennas 631 and 632 of base station 901 will respectively transmit the following pre-coded signals, $T_{21}$ and $T_{22}$, when unitary pre-coding stage uses P2 as the pre-coding matrix:

$$T21 = \frac{(S1 + jS2)}{\sqrt{2}}$$

$$T22 = \frac{(S1 - jS2)}{\sqrt{2}}$$

Figure 10:
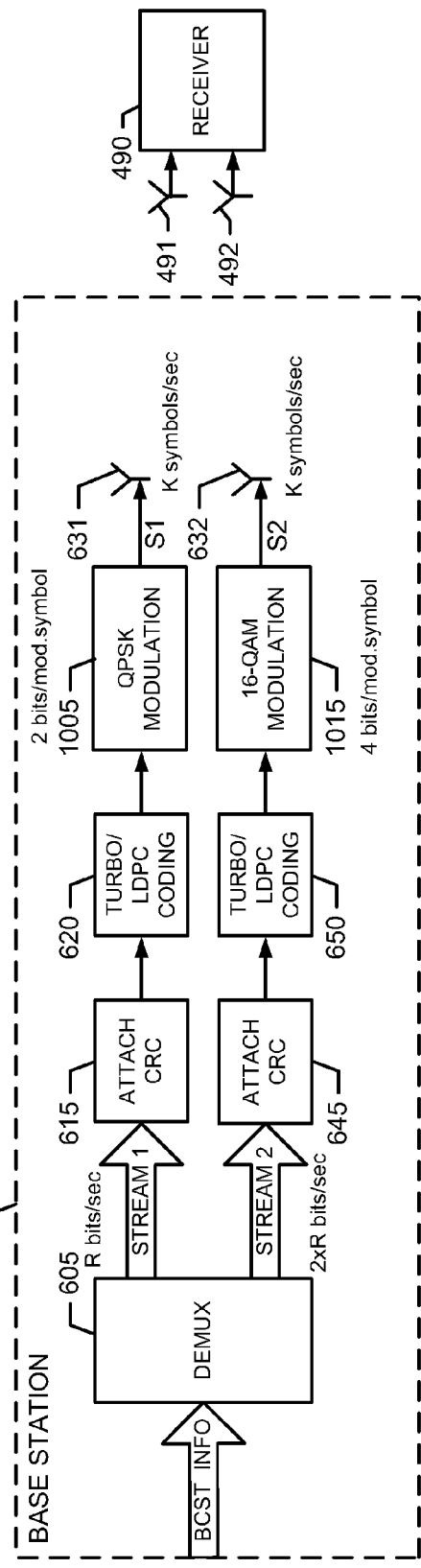
FIG. 10 shows a block diagram of still another alternative base station usable in one embodiment of the disclosed wireless communication system.

FIG. 10 shows another base station 1001 usable as a base station in a broadcast zone. Base station 1001 employs two modulation types, one modulation type exhibiting a level of robustness greater than the other modulation type. For example, base station 1001 employs QPSK modulation as the more robust modulation type and QAM 16 as the less robust modulation type. By robustness is meant that some communications mechanisms or methods exhibit a higher level of signal quality that other mechanisms or methods. For example, QPSK typically exhibits greater signal quality or level of robustness that QAM. Some mechanisms or methods are less susceptible to interferers than other mechanisms and thus exhibit a higher level of robustness. The topology of base station 1001 is similar to that of base station 601 of FIG. 6 with like numbers indicating like components. Attach CRC stage 615, turbo/LDPC coding stage 620, QPSK modulation stage 1005 and antenna 631 form a signal path that processes information stream STREAM 1. Attach CRC stage 645, turbo/LDPC coding stage 650, 16-QAM modulation stage 1015 and antenna 632 form a signal path that processes information stream STREAM 2.

As described above, base station 1001 employs a modulation type in modulator 1005 for the information stream STREAM 1 that is more robust than the modulation type employed by modulation stage 1015 for the information stream STREAM 2. In this representative embodiment, modulation stage 1005 is a QPSK modulator and modulation stage 1015 is a 16-QAM modulator. QPSK modulator 1005 transmits information in a more robust signalling format than 16-QAM modulator 1015. DMUX 605 divides the broadcast information into two information streams, namely STREAM 1 and STREAM 2, as shown. One output of DMUX 605 is series to parallel converted to generate information stream STREAM 1 that exhibits a data rate, R, bit/sec. The remaining output of DMUX 605 is series to parallel converted to generate information stream STREAM 2 that exhibits a data rate of 2×R bits/sec. However, in this particular embodiment, the modulation symbol rates transmitted by antennas 631 and 632 are the same, namely K symbols/sec, as indicated in FIG. 10. Modulation stage 1005 employs QPSK modulation with 2 bits/symbol for information stream STREAM 1 and modulation stage 1015 employs 16-QAM modulation for information STREAM 2, thus resulting in the same modulation symbol rate, K symbols/sec, being transmitted by both antennas 631 and 632.

In yet another embodiment, FIG. 11 shows a base station 1101 that is capable of transmitting information over multiple transmit antennas wherein coding stage 1120 employs a more robust coding for the information stream STREAM 1 than the coding that coding stage 1150 employs for the information stream STREAM 2. In this particular example, coding stage 1120 employs a coding rate of ⅓ and coding stage 1150 employs a coding rate of ⅔. A coding rate is a ratio between the number of input bits to an encoder and the number of output bits from the encoder. A coding rate of ⅓ means that the number of bits at the output of the encoder is 3 times larger than the number of input bits to the encoder. The coding rate of ⅓ employed by coding stage 1120 is more robust or reliable than the coding rate of ⅔ employed by coding stage 1150. Coding rates other than these coding rates, given for purposes of example, may also be employed as long as the coding rate of one coding stage is selected to be more robust than the coding rate of the other coding stage.

In a manner similar to base station 1001 of FIG. 10, the serial to parallel converted signals at the two outputs of DMUX 605 exhibit R bits/sec for information stream STREAM 1 and 2×R bits/sec for information stream STREAM 2. However, the modulation symbol rate actually transmitted by antennas 631 and 632 is the same, namely K symbols/sec, because coding stage 1120 codes information stream STREAM 1 using a ⅓ coding rate (R=⅓) while coding stage 1150 codes information stream STREAM2 using a ⅔ coding rate (R=⅔).

FIG. 12 shows yet another embodiment of a base station 1201 usable as the base stations of a broadcast zone wherein one antenna of the base station transmits at a higher power level than the other antenna of the base station. Base station 1201 includes a unitary pre-code stage 1205 that pre-codes modulated symbols S1 and S2 in information streams STREAM1 and STREAM 2 in a manner similar to unitary pre-coding stage 905 of FIG. 9. However, base station 1201 includes radio frequency (RF) power amplifiers (PAs) 1215 and 1220 that respectively amplify the modulated S1 signals in STREAM 1 and the modulated S2 signals in STREAM 2. In this embodiment, RF PA 1215 exhibits higher power gain than RF PA 1220. Thus, antenna 631 transmits information stream STREAM 1 at a higher power level than antenna 632 transmits information stream STREAM 2. In practice, the broadcast zone may include many base stations such as 1201, each within its respective cell. In such a system, each of the multiple antennas 631 that transmit STREAM 1 exhibit a higher radiated power output than each of the antennas 632 that transmit the STREAM 2. This multiple level transmit power configuration with higher power for STREAM 1 than STREAM 2 makes decoding STREAM 1 by a mobile receiver 490 receiving the broadcast content more reliable. A higher transmit power on an information stream translates into a higher signal quality for that stream when received by a receiver such a receiver 490.

Figure 13:
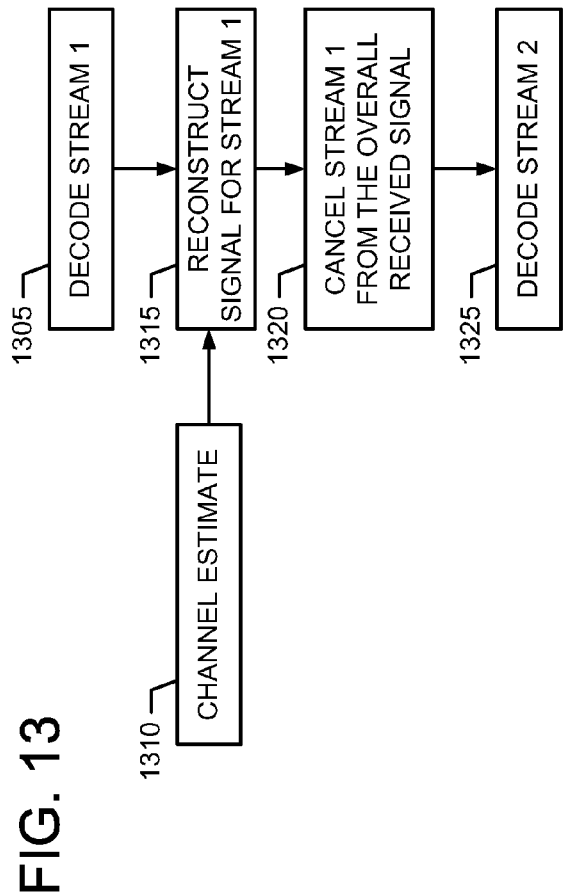
FIG. 13 is a flowchart that shows stream interference cancellation methodology that a receiver in a mobile device may employ in the disclosed wireless communication system.

FIG. 13 is a flowchart which shows stream interference cancellation that receiver 490 of FIGS. 4-7 and FIGS. 9-12 may employ. In this example, the base stations transmit information STREAM 1 employing a more robust modulation type, a more robust coding or a higher power than information stream STREAM 2, as described in the above representative embodiments of FIGS. 10, 11 and 12, respectively. As seen in the flowchart of FIG. 13, mobile station receiver 490 first decodes the information stream STREAM 1 that exhibits the more robust modulation type, more robust coding or higher power than the remaining stream or streams, as per block 1305. The receiver 490 then determines a channel estimate that is derived from reference pilot signals in the received signal, as per block 1310. Although not specifically shown, the transmitters depicted in FIGS. 4-7 and FIGS. 9-12 may employ pilot signals to enable coherent demodulation by the receivers shown in FIGS. 4-7 and FIGS. 9-12. These pilot signals, which may also be called reference signals, are sequences that are known at the receiver. After determining a channel estimate, the receiver 490 reconstructs the signal for information stream STREAM 1 based on the channel estimate derived from the received reference pilot signals, as per block 1315, to provide a reconstructed STREAM 1. Next, the receiver 490 cancels the reconstructed STREAM 1 from the overall received signal, as per block 1320, thus leaving a received STREAM 2 remaining after cancellation. Receiver 490 then uses the signal that results from this cancellation to decode the information STREAM 2 received by receiver 490, as per block 1325. The overall received signal may be also referred to as a composite signal because it may include both STREAM1 and STREAM2.

Figure 14:
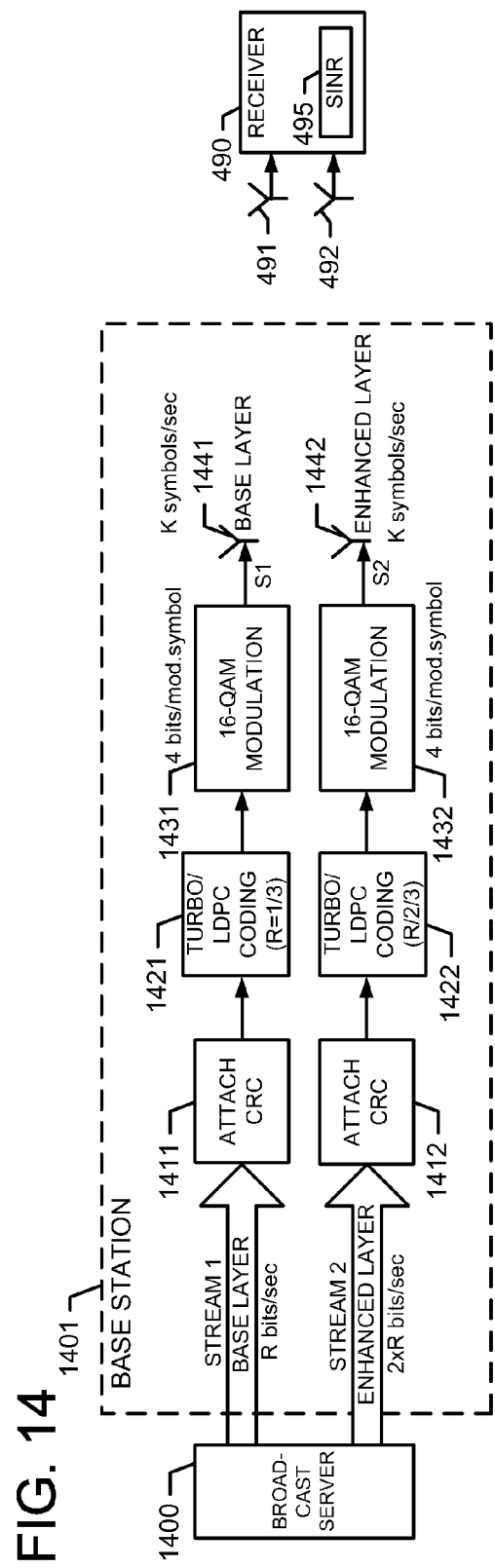
FIG. 14 shows a block diagram of another alternative base station usable in one embodiment of the disclosed wireless communication system.

FIG. 14 is a block diagram that depicts a broadcast content server 1400 coupled to a base station 1401. In actual practice, content server 1400 may be coupled to several base stations like base station 1401, each base station being situated in its own cell. Broadcast content server 1400 splits the content into information streams STREAM 1 and STREAM 2 at the respective outputs of server 1400. Information stream STREAM 1 includes a base layer of information and information stream STREAM 2 includes an enhanced layer of information as shown. The base layer and the enhanced layer are processed by respective signal paths in the base station as described below, before ultimately being transmitted by antennas 1441 and 1442, respectively. Base station 1401 includes an attach CRC stage 1411, a turbo/LDPC coding stage 1421, a QAM modulation stage 1431 and an antenna 1441, that together form a signal path for the base layer of information STREAM 1. Base station 1401 also includes an attach CRC stage 1412, a turbo/LDPC coding stage 1422, a QAM modulation stage 1432 and an antenna 1442, that together form a signal path for the enhanced layer of information STREAM 2.

The base layer and enhanced layer each carry the same broadcast program such as a video streaming application, for example. The base layer of STREAM 1 may include a relatively low quality audio feed and relatively low resolution video, whereas the enhanced layer of STREAM 2 may include a relatively high quality audio feed and a relatively high resolution video. In other words, the enhanced layer may include higher resolution audio, video and/or other information as compared with the base layer. The enhanced layer may carry additional information to enhance the audio and video quality of a video streaming application that provides or handles content in server 1405.

All mobile station receivers 490 in a broadcast zone of base stations decode the base layer upon reception of a signal containing the base layer in the broadcast content. However, in one embodiment, only those mobile station receivers 490 currently experiencing more that a predetermined level of channel quality will decode the enhanced layer. To make this determination with respect to the quality of the received signal, receiver 490 may include a channel quality indicator circuit 495. A signal to interference plus noise ratio (SINR) circuit is one example of a device for determining the quality of a received signal that receiver 490 may employ as channel quality indicator circuit 495. By decoding the enhanced layer, those mobile stations experiencing more than the predetermined channel quality level, namely those mobile stations relatively close to the base station, may provide higher quality received video and audio or other information.

As seen in FIG. 14, the base layer of information STREAM 1 exhibits a data rate of R bits per second, while the enhanced layer of information STREAM 2 exhibits a data rate of 2×R bits per second. Thus, a mobile station receiver 490 that receives only the base layer may receive a data rate of R bits per second. However, a mobile station receiver 490 that successfully decodes the enhanced layer as well as the base layer effectively receives the broadcast content at a rate 3 times higher than the base layer alone or 3×R bits per second.

In a one embodiment, modulation stages 1431 and 1432 are 16-QAM modulation stages. Thus, base station 1401 transmits both the base layer and the enhanced layer in 16-QAM modulation. However, in one embodiment, base station 1401 may employ a more robust coding rate of ⅓ for the base layer and a relatively less robust coding rate of ⅔ for the enhanced layer. More particularly, turbo/LDPC coding stage 1421 applies a more robust coding rate of R=⅓ to the base layer and turbo/LDPC coding stage 1422 applies a less robust coding rate of R=⅔ to the enhanced layer. Moreover, in one embodiment, reception of the base layer is made more reliable by using a more robust modulation type such as QPSK in modulation stage 1431 while modulation stage 1432 uses less robust QAM modulation for the enhanced layer. Reception of the base layer may also be made more reliable by using higher RF power to transmit the base layer from antenna 1441 than the RF power at antenna 1442. An RF amplifier (not shown) may be situated between modulation stage 1431 and antenna 1441 for this purpose along with another RF amplifier (not shown) between modulation stage 1432 and antenna 1442. In that scenario, the RF amplifier coupled to antenna 1441 exhibits a higher RF output power or gain than the RF amplifier coupled to antenna 1442. In another embodiment, a unitary pre-coding stage such as stage 905 of FIG. 9 may be used at the outputs of modulation stages 1431 and 1432 to pre-code the base layer and the enhanced layer with a pre-coding matrix to increase reception reliability. In yet another embodiment, base station 1401 may scramble the base layer and the enhanced layer with different scrambling codes to randomize inter-stream interference. The transmitter may perform this scrambling operation after modulation and before mapping the symbols to an input of an IFFT (not shown) in the transmitter. A scrambling code generally is a pseudo-random number (PN) sequence that is pre-known at the receiver. For example, the receiver stores the pseudo-random sequence in a non-volatile memory therein. The transmitter multiplies the transmitted symbols with the scrambling code, namely the pseudo-random sequence. The descrambling at the receiver is achieved by correlating the received modulation symbols with the scrambling sequence used by the transmitter. It is noted that each of above the techniques for increasing the reliability of reception may be used in combination with one another to increase the reliability of reception by a mobile station receiver.

Figure 15:
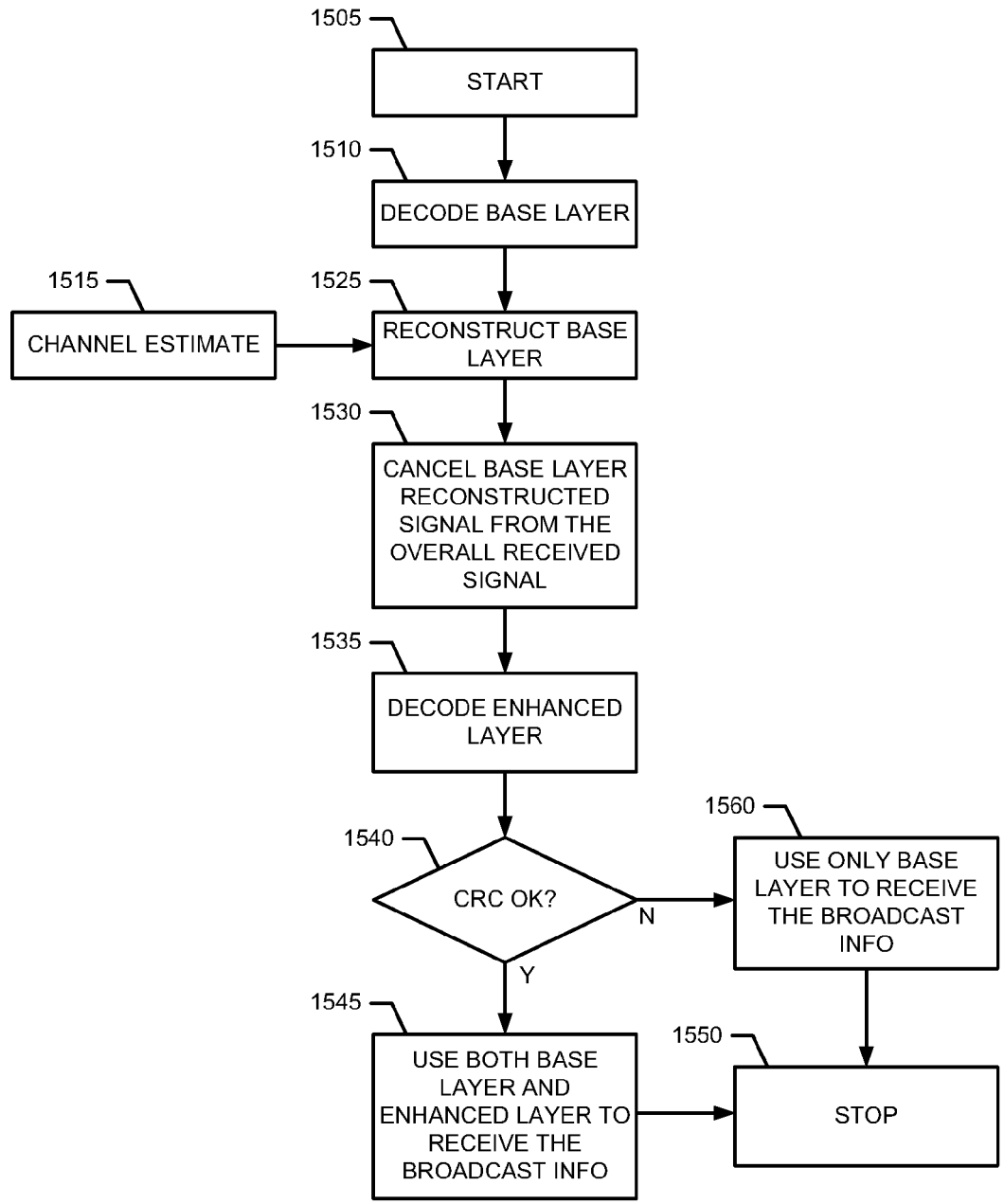
FIG. 15 is a flowchart that depicts reception and decoding of a base layer and an enhanced layer transmitted by base stations in the disclosed wireless communication system.

FIG. 15 is a flowchart that shows the methodology that mobile station 490 of FIG. 14 employs to receive the base layer and enhanced layer transmitted by base station 1401. Process flow commences with start block 1505. All mobile stations 490 in the broadcast zone first decode the base layer, as per block 1510. As described above, base station 1401 transmits the base layer with high reliability namely with more robust coding, more robust modulation, and/or higher power in comparison with the coding, modulation or power used to transmit the enhanced layer. Receiver 409 performs a channel estimate, as per block 1515. The receiver uses such channel estimates for reconstructing the decoded base layer for cancellation from the overall received signal. All mobile stations 409 receiving a broadcast stream in the broadcast zone first decode the base layer, as noted above. Because the base layer is transmitted with higher reliability or more robustness than the enhanced layer, it is likely that most mobile stations within the broadcast zone will be able to receive and decode the base layer, whereas some mobile stations may not be able to both receive and decode the enhanced layer. The base layer is reconstructed by the receiver using the channel estimate information, as per block 1525. Receiver 490 then cancels the reconstructed base layer from the overall received signal, thus isolating the enhanced layer, as per block 1530. Receiver 490 subsequently decodes the enhanced base layer, as per block 1535. The overall received signal may also be referred to as a composite signal because it may include both the base layer and the enhanced layer.

Mobile station receiver 490 performs a cyclic redundancy code (CRC) check on the decoded enhanced layer, as per decision block 1540. If the CRC check indicates that the integrity of the enhanced layer has been preserved, i.e. the CRC is OK, then receiver 490 may use both the base layer and the enhanced layer to receive the video/audio or other information signal transmitted to receiver 490, as per block 1545. Process flow stops at end block 1550 when reception of the broadcast information on the base layer and the enhanced layer is complete. However, if the CRC check fails, thus indicating that the integrity of the enhanced signal has not been preserved, then receiver 490 uses only the previously decoded base layer to receive the broadcasted information from the base station. Process flow stops at end block 1550 when reception of the base layer is complete. In this manner, a mobile station receiver 490 can improve the quality of broadcast reception of video images, audio and/or other information signals, when the signal strength that the mobile station receives permits reception and decoding of both the base layer and the enhanced layer.

Figure 16:
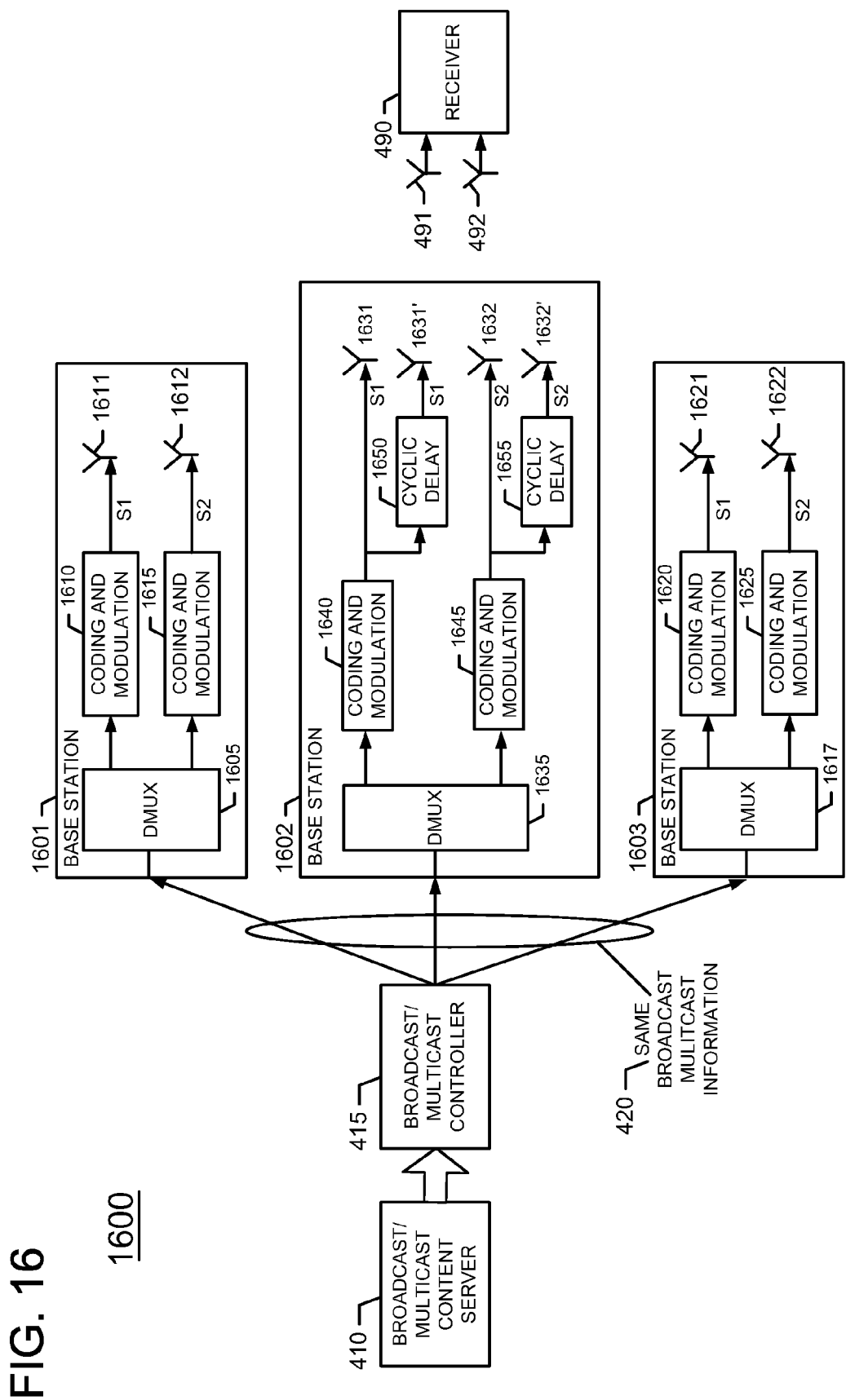
FIG. 16 shows a block diagram of yet another alternative base station usable in one embodiment of the disclosed wireless communication system.

FIG. 16 shows another embodiment of the wireless communication system, namely system 1600, wherein some of the base stations employ 2 antennas and other base stations employ more than 2 antennas, for example 4 antennas, for improved reception. Wireless communication system 1600 includes elements in common with wireless communication system 400 of FIG. 4A. Like numbers are used to indicate like elements when comparing these two systems. In system 1600, broadcast/multicast content server 410 provides information to broadcast/multicast controller 415. Controller 415 couples to base stations 1601, 1602 and 1603 to provide the information, now designated as information 420, to these base stations in their respective cells.

System 1600 includes base stations 1601, 1602 and 1603 that are situated in the same broadcast zone, each base station being situated in a respective cell within the broadcast zone. Base stations 1601 and 1603 each employ two antennas to transmit information. In contrast, base station 1602 employs four antennas to transmit information in this embodiment. More particularly, base station 1601 includes antennas 1611 and 1612 for transmitting modulated symbols S1 and S2, respectively, whereas base station 1603 includes antennas 1621 and 1622 for transmitting modulated symbols S1 and S2, respectively. Base station 1602 employs four antennas to transmit information, namely antennas 1631 and 1631' to transmit modulated symbols S1, and antennas 1632 and 1632' to transmit the modulated S2 symbols.

The configuration of base stations 1601 and 1603 is similar to that of base stations 501 and 503 of FIG. 5. Base station 1601 includes a demultiplexer (DMUX) 1605 that provides two information streams to coding and modulation stages 1610 and 1615, respectively. Coding and modulation stages 1610 and 1615 respectively provide modulated signals S1 and S2 to two antennas 1611 and 1612, respectively. Base station 1603 includes a DMUX 1617 that provides 2 information streams to coding and modulation stages 1620 and 1625, respectively. Coding and modulation stages 1620 and 1625 respectively provide modulated signals S1 and S2 to antennas 1621 and 1622, respectively.

Like the other embodiments discussed above, base stations 1601 and 1602 transmit information via two spatially multiplexed streams on two antennas, namely antennas 1611, 1612 in the case of base station 1601 and antennas 1621, 1622 in the case of base station 1603. However, base station 1602 employs 4 antennas to transmit two spatially multiplexed streams from four antennas, namely antenna pair 1631, 1631' for the S1 modulated symbols and antenna pair 1632, 1632' for the S2 modulated symbols. Base station 1602 employs cyclic diversity for each pair of antennas to achieve such spatially multiplexed transmission from 4 antennas as described below.

Base station 1602 employs a DMUX 1635 to split the information content it receives from broadcast/multicast controller 415 into two information streams at its respective two outputs. Coding and modulation stage 1640 codes and modulates one of these streams into symbols S1, while coding and modulation stage 1645 codes and modulates the other of these two streams into symbols S2. The output of coding and modulation stage 1640 couples to antenna 1631 as shown. The output of coding and modulation stage 1640 also couples to antenna 1631' via a cyclic delay stage 1650 therebetween. In this manner, the information stream containing the S1 symbols is provided to antenna 1631 without delay, while the same information stream is provided to antenna 1631' with cyclic delay. Similarly, coding and modulation stage 1645 provides an information stream containing the S2 symbols to antenna 1632, while also providing the same information stream to antenna 1632 with the cyclic delay of cyclic delay stage 1655. In another embodiment, random phase shifts may be applied to the subcarriers transmitted from antennas 1631' and 1632'. In such an embodiment, frequency-diversity may be obtained without introducing cyclic delays.

Base station 1602 achieves the transmission of two spatially multiplexed information streams from four antennas by using cyclic delay diversity from each pair of two transmit antennas, namely antenna pair 1631, 1631' and antenna pair 1632, 1632'. Antenna pair 1631, 1631' transmits the information stream containing the S1 symbols, while antenna pair 1632, 1632' transmits the information stream containing the S2 symbols. The information stream containing the S1 symbols is transmitted over antenna 1631' with a cyclic delay provided by delay stage 1650, while the information stream containing S2 symbols is transmitted over antenna 1632' with a cyclic delay provided by delay stage 1655. The cyclic delay in these two streams provides additional frequency-diversity when the system is configured for single frequency network (SFN) operation using orthogonal frequency division multiplexing (OFDM). It is noted that the mobile station receiver 490 does not need to know if the transmission from the base station is provided using 2 transmit antennas or 4 transmit antennas because the cyclic delay of the delayed streams appears as multi-path propagation to the mobile receiver 490.

Figure 17:
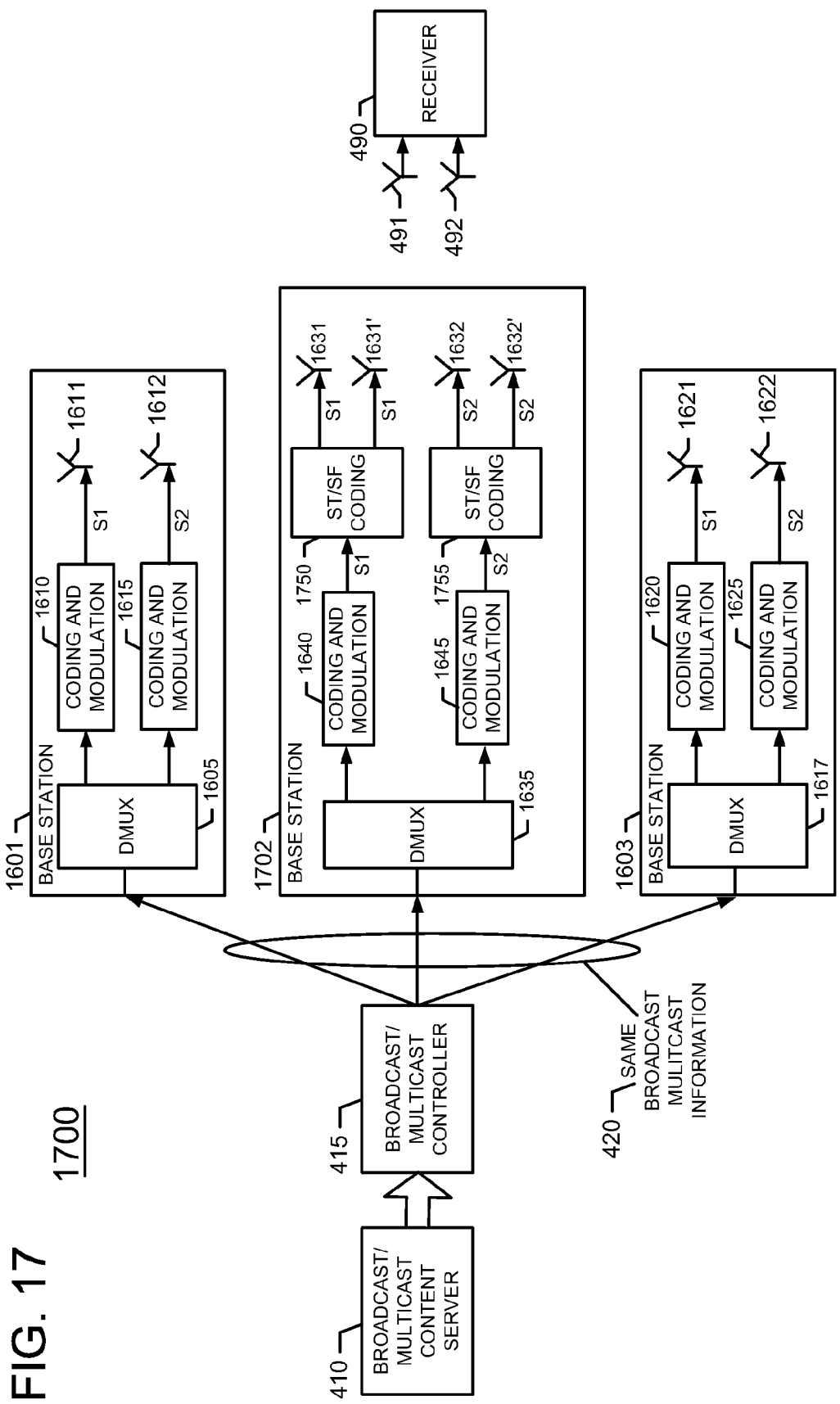
FIG. 17 shows a block diagram of still another alternative base station usable in one embodiment of the disclosed wireless communication system.

FIG. 17 shows another embodiment of the wireless communication system as system 1700. System 1700 is similar to system 1600 of FIG. 16, except for the base station 1702 that system 1700 employs instead of base station 1602. Base station 1702 transmits information streams over 4 antennas, 1631, 1631' and 1632, 1632'. Base station 1702 employs space-time (ST) coding or space-frequency (SF) coding to achieve transmit diversity from the 4 transmit antennas. In more detail, base station 1702 includes a space-time (ST) or space-frequency (SF) coding stage 1750 between coding and modulation stage 1640 and antenna pair 1631, 1631'. ST/SF coding stage provides the S1 symbols to antennas 1631, 1631' after space-time or space-frequency coding those symbols. Base station 1702 also includes a space-time (ST) or space-frequency (SF) coding stage 1755 between coding and modulation stage 1645 and antenna pair 1632, 1632'. ST/SF coding stage 1755 provides the S2 symbols to antenna pair 1632, 1632' after space-time or space-frequency coding those symbols.

Figure 18:
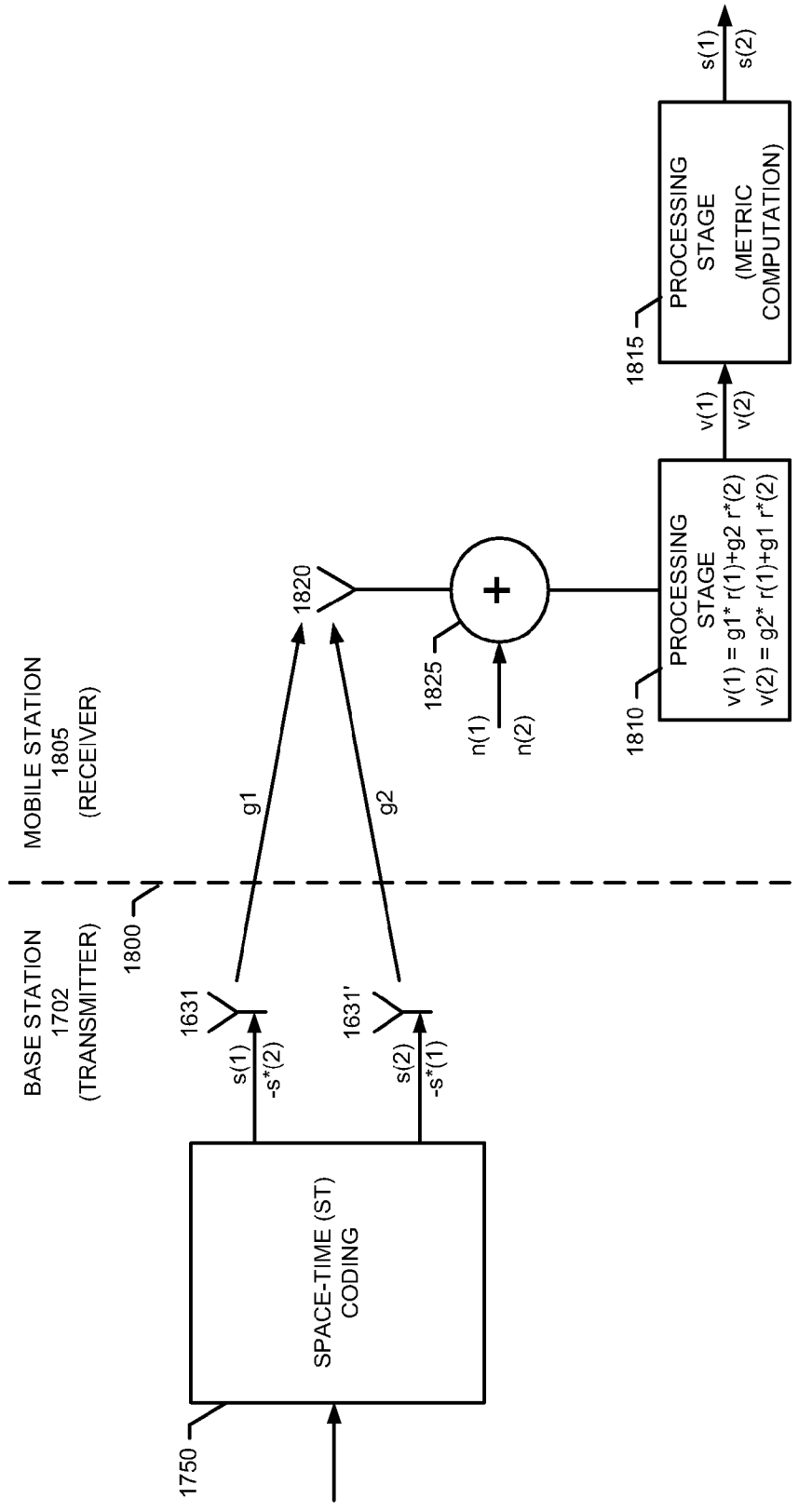
FIG. 18 shows a block diagram of another base station usable in one embodiment of the disclosed wireless communication system.

One example of transmit diversity that base station 1702 of FIG. 17 may employ is an Alamouti 2×1 space-time (ST) diversity scheme such as shown in FIG. 18. More particularly, FIG. 18 shows the ST coding portion of base station 1702 as including a space-time (ST) coding stage 1750 coupled to antennas 1631 and 1631'. Components to the left of dashed line 1800 represent base station 1702, namely the transmitter, and components to the right of dashed line 1800 represent a portion of a mobile station receiver 1805. In this approach, during any symbol period, two data symbols are transmitted simultaneously from the two transmit antennas 1631 and 1631', respectively. For example, during a first symbol period or interval, antennas 1631 and 1631' transmit the s(1) and s(2) symbols, respectively, as shown in FIG. 18. It is noted that in FIG. 17, S1 and S2 denote two data streams. Returning to FIG. 18, s(1) and s(2) are two consecutive symbols from the same data stream. Data stream s1 may further include symbols s1(1) and s1(2) as two consecutive symbols. During the next symbol period after the first symbol period, antennas 1631 and 1631' transmit the symbols −s*(2) and s*(1), respectively, wherein s* represents the complex conjugate of s. With some processing at the receiver, as denoted by processing stages 1810 and 1815, the receiver can recover the original symbols s(1) and s(2). Receiver 1805 includes an antenna 1820 that couples to one input of an adder or summer 1825. Either an n(1) signal or an n(2) signal is provided to the remaining input of adder 1825 as shown, wherein n(1) and n(2) are additive white Gaussian noise (AWGN) samples. Adder 1825 adds the n(1) and n(2) noise samples to the incoming signals from antenna 1820. Each of the signal paths between transmitter antenna 1631 and receiver antenna 1820, and between transmitter antenna 1631' and receiver antenna 1820, exhibit channel gain which may vary over time. Receiver 1805 may employ a digital signal processor (DSP, not shown) to prepare instantaneous channel gain estimates g1 and g2 for the signal paths from antenna 1631 and antenna 1631'. The system provides separate pilot symbols on both the antennas for channel gain estimation at the receiver. The diversity gain achieved by Alamouti coding is the same as that achieved in Maximum Ratio Combining (MRC). Moreover, a 2×1 Alamouti scheme may also be implemented in a space-frequency coded form. In this case, the two symbols are transmitted on two different frequencies, for example, on different subcarriers in an Orthogonal Frequency Division Multiplexing (OFDM) system. In actual practice, adder 1825 and processing stages 1810 and 1815 may be combined in a common digital signal processor (DSP) integrated circuit or ASIC. For purposes of FIG. 18, r1 and r2 are defined as follows: r1=g1s1+g2s2+n1 and r2=−g1s2*−g2s1*+n2. "v" is defined by the equations in processing stage 1810 as shown in FIG. 18. Processing stage 1815 computes symbol decision variables s(1) and s(2).

Figure 19:
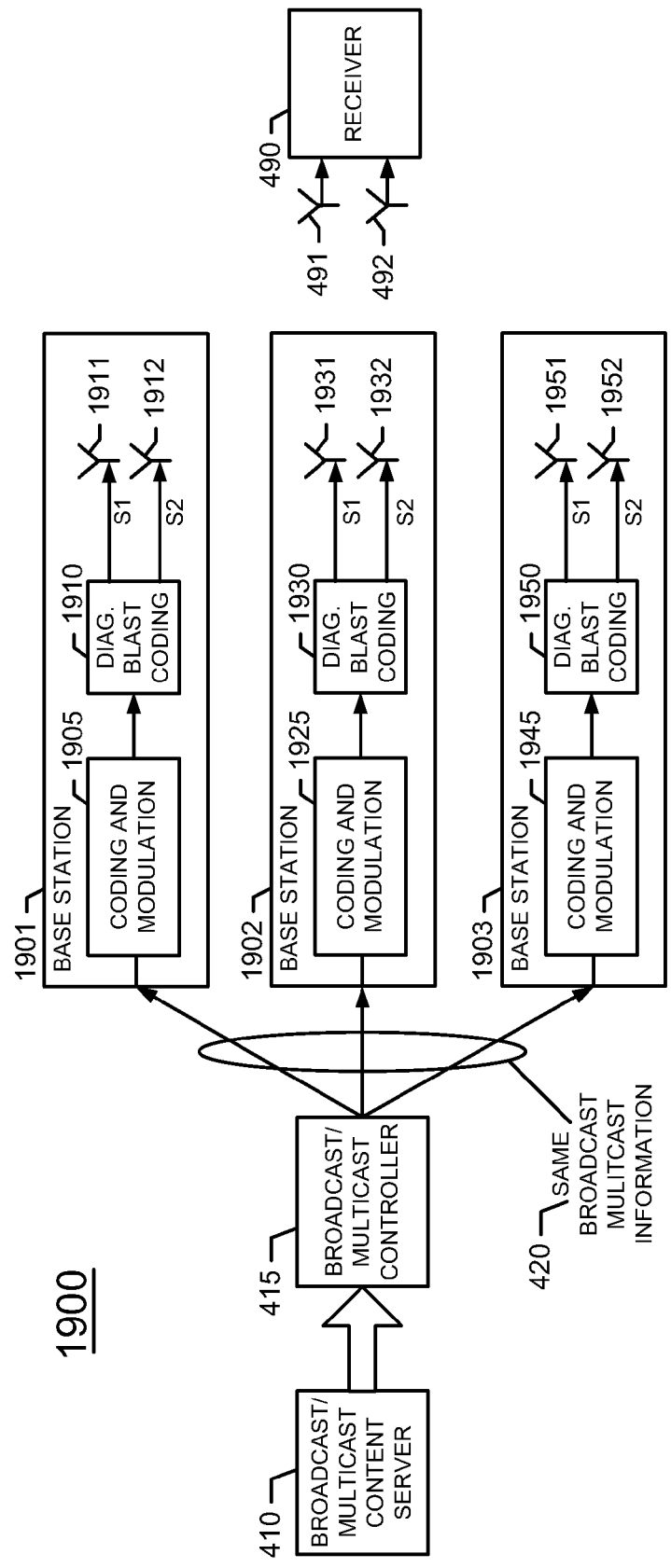
FIG. 19 shows another embodiment of the wireless communication system.

FIG. 19 shows another embodiment of the wireless communication system as system 1900. System 1900 includes base stations 1901, 1902 and 1903 situated in respective cells that together form a broadcast zone. Base station 1901 includes a coding and modulation stage 1905 that channel codes and modulates the information it receives from broadcast/multicast controller 415. Coding and modulation stage 1905 provides a coded modulated information stream at its output. The coding and modulation methods described above may be employed in coding and modulation stage 1905 to produce the coded modulation information stream. A diagonal BLAST coding stage 1910 couples to the output of coding and modulation stage 1905. Coding stage 1910 splits the coded modulation information stream from the coding and modulation stage 1905 into two streams S1 and S2 that are diagonally BLAST (or D-BLAST) coded, wherein D-BLAST denotes Diagonal Bell Laboratories Layered Space-Time Architecture coding. In diagonal BLAST, or D-BLAST, multiple codewords are staggered so that each codeword spans multiple transmit antennas, but the symbols sent simultaneously by the different transmit antennas belong to different codewords. Therefore, symbol coding in D-BLAST is performed across the antennas to obtain better performance. Antennas 1911 and 1912 transmit the S1 and S2 symbol streams, respectively. Base stations 1902 and 1903 exhibit substantially the same topology as base station 1901. In base stations 1902 and 1903, coding and modulation stages 1925 and 1945 correspond to coding and modulation stage 1905 of base station 1901. Diagonal BLAST coding stages 1930 and 1950 correspond to diagonal BLAST stage 1910 of base station 1901. Base stations 1901, 1902 and 1903 transmit the S1 information stream via corresponding antennas 1911, 1931 and 1951, respectively. In a similar manner, base stations 1901, 1902 and 1903 transmit the S2 information stream via corresponding antennas 1912, 1932 and 1952, respectively. In one embodiment, the receiver 490 receives first codeword (S1) and then cancels first codeword (S1) from the received signal. The receiver then decodes the second codeword (S2).

A wireless communication system is thus disclosed wherein an information source communicates with a mobile station via multiple intermediary base stations located in respective cells of a broadcast zone. In one embodiment, each base station sends multiple information streams that may be received by a mobile station located in the broadcast zone. By receiving multiple information streams from multiple base stations, the mobile station may enhance reception. In one embodiment, a base station transmits multiple information streams with different levels of robustness. The robustness of a particular transmitted information stream may be determined for example by the particular coding of the transmitted information stream, the particular modulation type of the transmitted information stream and the particular power level of the transmitted information stream.

In another embodiment, an information source communicates a base layer information stream and an enhanced layer information stream to multiple base stations in a broadcast zone. The base layer information stream and the enhanced layer information stream may each include the same information content. However, the enhanced layer information stream may include a higher resolution version of the information content than the base layer information stream. Each base station transmits the base layer information stream and the enhanced layer information stream. If a mobile station in the broadcast zone receives base layer information streams and also reliably receives enhanced layer information streams, the mobile station may use both the enhanced layer information streams and the base layer information streams to reconstruct the original information content from the information source. However, if the mobile station does not reliably receive enhanced layer information streams, then the mobile station reconstructs the original information content from the received base layer information streams.

Modifications and alternative embodiments of this invention will be apparent to those skilled in the art in view of this description of the invention. Accordingly, this description teaches those skilled in the art the manner of carrying out the invention and is to be construed as illustrative only. The forms of the invention shown and described constitute the present embodiments. Persons skilled in the art may make various changes in the shape, size and arrangement of parts. For example, persons skilled in the art may substitute equivalent elements for the elements illustrated and described here. Moreover, persons skilled in the art after having the benefit of this description of the invention may use certain features of the invention independently of the use of other features, without departing from the scope of the invention.

What is claimed is:

1. A wireless communication system, comprising:
   an information source configured to provide a first information stream including a base layer and a second information stream including an enhanced layer, the base layer and the enhanced layer including information content;
   a plurality of base stations, coupled to the information source, each base station configured to transmit a first modulated signal including the base layer and a second modulated signal including the enhanced layer; and
   a mobile receiving station configured to:
      receive some of the first modulated signals to provide first received signals including the base layer and is further configured to receive some of the second modulated signals to provide second received signals including the enhanced layer,
      test the second received signals to determine if the mobile receiving station reliably received the second received signals,
      process both the base layer and the enhanced layer of the first and second received signals, respectively, to reconstruct the information content if the mobile receiving station reliably received the second received signals, and
      reconstruct the enhanced layer by canceling the base layer from the first modulated signal.

2. The wireless communication system of claim 1, wherein the mobile receiving station is configured to process the base layer of the first received signals to reconstruct the information content if the mobile receiving station did not reliably receive the second received signals.

3. The wireless communication system of claim 1, wherein the base layer and the enhanced layer contain the same information content at different respective resolutions.

4. The wireless communication system of claim 1, wherein the base layer includes one of audio content exhibiting less than a predetermined audio resolution and video content exhibiting less than a predetermined video resolution.

5. The wireless communication system of claim 4, wherein the enhanced layer includes one of audio content exhibiting mater than the predetermined audio resolution and video content exhibiting greater than the predetermined video resolution.

6. The wireless communication system of claim 1, wherein each base station is configured to generate the first modulated signal by applying the base layer to a first modulation mechanism that exhibits a higher level of robustness than a second modulation mechanism used to generate the second modulated signal from the enhanced layer.

7. The wireless communication system of claim 1, wherein each base station is configured to generate the first modulated signal by applying the base layer to a first coding mechanism that exhibits a higher level of robustness than a second coding mechanism used to generate the second modulated signal from the enhanced layer.

8. The wireless communication system of claim 1, wherein each base station is configured to transmit the first modulated signal at a higher radio frequency power level than the second modulated signal is transmitted.

9. The wireless communication system of claim 1, wherein each base station is configured to code the base layer and the enhanced layer of the first and second modulated signals.

10. A method of transmitting and receiving information, the method comprising:
    providing, by an information source, information content to a plurality of base stations situated in respective cells, the information content including a first information stream including a base layer and a second information stream including an enhanced layer;
    transmitting, by each of the base stations, a first modulated signal including the base layer and a second modulated signal including the enhanced layer;
    receiving, by a mobile receiving station, some of the first modulated signals to provide first received signals including the base layer;
    receiving, by the mobile receiving station, some of the second modulated signals to provide second received signals including the enhanced layer;
    testing, by the mobile receiving station, the second received signals to determine if the mobile receiving station reliably received the second received signals;
    reconstructing, by the mobile receiving station, the enhanced layer by canceling the base layer from the first information stream and testing the integrity of the enhanced layer using at least one cyclic redundancy code; and
    processing, by the mobile receiving station, both the base layer and the enhanced layer of the first and second received signals, respectively, to reconstruct the information content if the testing determined that the mobile receiving station reliably received the second received signals.

11. The method of claim 10, further comprising processing, by the mobile receiving station, the base layer of the first received signals to reconstruct the information content if the testing determined that the mobile receiving station did not reliably receive the second received signals.

12. The method of claim 10, wherein the base layer and the enhanced layer contain the same content at different respective resolutions.

13. The method of claim 10, wherein the base layer includes one of audio content exhibiting less than a predetermined audio resolution and video content exhibiting less than a predetermined video resolution.

14. The method of claim 13, wherein the enhanced layer includes one of audio content exhibiting greater than the predetermined audio resolution and video content exhibiting greater than the predetermined video resolution.

15. The method of claim 10, wherein transmitting includes generating the first modulated signal by applying the base layer to a first modulation mechanism that exhibits a higher level of robustness than a second modulation mechanism used to generate the second modulated signal from the enhanced layer.

16. The method of claim 10, wherein transmitting includes generating the first modulated signal by applying the base layer to a first coding mechanism that exhibits a higher level of robustness than a second coding mechanism used to generate the second modulated signal from the enhanced layer.

17. The method of claim 10, wherein transmitting includes transmitting the first modulated signal at a higher radio frequency power level than the second modulated signal is transmitted.

18. The method of claim 10, further comprising:
coding, by the base stations, the base layer and the enhanced layer of the first and second modulated signals, respectively, prior to transmitting.

19. The method of claim 18, wherein the first and second modulated signals form a composite signal, the method further comprising:
decoding, by the mobile receiving station, the base layer of the first modulated signals;
cancelling, by the mobile receiving station, the base layer from the composite signal thus leaving the enhanced layer; and
decoding, by the mobile receiving station, the enhanced layer.

20. A method of transmitting information, the method comprising:
providing, by an information source, information content to a plurality of base stations situated in respective cells, the information content including a first information stream including a base layer and a second information stream including an enhanced layer; and
transmitting, by each of the base stations, a first modulated signal including the base layer and a second modulated signal including the enhanced layer, wherein the first modulated signal comprises at least one cyclic redundancy code that can be used to verify the reception of the enhanced layer,
wherein the enhanced layer is reconstructed by a mobile station by canceling the base layer from the first modulated signal.

21. The method of claim 20, wherein the base layer includes one of audio content exhibiting less than a predetermined audio resolution and video content exhibiting less than a predetermined video resolution.

22. The method of claim 21, wherein the enhanced layer includes one of audio content exhibiting greater than the predetermined audio resolution and video content exhibiting greater than the predetermined video resolution.

23. The method of claim 20, wherein transmitting includes generating the first modulated signal by applying the base layer to a first modulation mechanism that exhibits a higher level of robustness than a second modulation mechanism used to generate the second modulated signal from the enhanced layer.

24. The method of claim 20, wherein transmitting includes generating the first modulated signal by applying the base layer to a first coding mechanism that exhibits a higher level of robustness than a second coding mechanism used to generate the second modulated signal from the enhanced layer.

25. The method of claim 20, wherein transmitting includes transmitting the first modulated signal at a higher radio frequency power level than the second modulated signal is transmitted.

26. A method of receiving information, the method comprising:
receiving, by a mobile receiving station, first modulated signals that include a base layer thus providing first received signals, the first modulated signals being transmitted with the base layer by a plurality of base stations;
receiving, by the mobile receiving station, second modulated signals that include an enhanced layer thus providing second received signals, the second modulated signals being transmitted with the enhanced layer by the plurality of base stations, the first and second modulated signals being derived from information content that is supplied to the plurality of base stations;
testing, by the mobile receiving station, the second received signals to determine if the mobile receiving station reliably received the second received signals;
reconstructing, by the mobile receiving station, the enhanced layer by canceling the base layer from the first modulated signals and testing the integrity of the enhanced layer using, at least one cyclic redundancy code; and
processing, by the mobile receiving station, both the base layer and the enhanced layer of the first and second received signals, respectively, to reconstruct the information content if the testing determined that the mobile receiving station reliably received the second received signals.

27. The method of claim 26, further comprising processing, by the mobile receiving station, the base layer of the first received signals to reconstruct the information content if the testing determined that the mobile receiving station did not reliably receive the second received signals.

28. The method of claim 26, wherein the base layer includes one of audio content exhibiting less than a predetermined audio resolution and video content exhibiting less than a predetermined video resolution.

29. The method of claim 28, wherein the enhanced layer includes one of audio content exhibiting greater than the predetermined audio resolution and video content exhibiting greater than the predetermined video resolution.

30. The method of claim 26, wherein the first and second modulated signals form a composite signal, the method further comprising:
decoding, by the mobile receiving station, the base layer of the first modulated signals;
cancelling, by the mobile receiving station, the base layer from the composite signal thus leaving the enhanced layer; and
decoding, by the mobile receiving station, the enhanced layer.

* * * * *